US012072461B2

(12) United States Patent
Tenghamn

(10) Patent No.: US 12,072,461 B2
(45) Date of Patent: Aug. 27, 2024

(54) MODIFIED SIMULTANEOUS LONG-OFFSET ACQUISITION WITH IMPROVED LOW FREQUENCY PERFORMANCE FOR FULL WAVEFIELD INVERSION

(71) Applicant: PGS Geophysical AS, Oslo (NO)

(72) Inventor: Stig Rune Lennart Tenghamn, Houston, TX (US)

(73) Assignee: PGS Geophysical AS, Oslo (NO)

( * ) Notice: Subject to any disclaimer, the term of this patent is extended or adjusted under 35 U.S.C. 154(b) by 733 days.

(21) Appl. No.: 16/881,992

(22) Filed: May 22, 2020

(65) Prior Publication Data
US 2021/0124073 A1    Apr. 29, 2021

Related U.S. Application Data

(60) Provisional application No. 62/926,958, filed on Oct. 28, 2019.

(51) Int. Cl.
*G01V 1/38*    (2006.01)
(52) U.S. Cl.
CPC .......... *G01V 1/3808* (2013.01); *G01V 1/3843* (2013.01); *G01V 2210/165* (2013.01)
(58) Field of Classification Search
CPC ............... G01V 1/3808; G01V 1/3843; G01V 2210/165
See application file for complete search history.

(56) References Cited

U.S. PATENT DOCUMENTS

| 2,757,356 A | 7/1956 | Haggerty |
| 3,744,021 A | 7/1973 | Todd |

(Continued)

FOREIGN PATENT DOCUMENTS

| CA | 2 300 116 C | 3/1999 |
| EP | 2 261 615 A2 | 12/2010 |

(Continued)

OTHER PUBLICATIONS

United Kingdom Search Report dated Mar. 15, 2021, for Application No. GB2017061.9.

(Continued)

*Primary Examiner* — Krystine E Breier

(57) ABSTRACT

A method and apparatus includes: towing a first source with a source vessel; towing a second source with a survey vessel, the survey vessel following the source vessel by at least 5 km; towing a streamer spread at a first depth with the survey vessel; and towing a pair of long-offset streamers at a second depth and following the source vessel by at least 5 km, wherein: the first depth is 10 m to 30 m, and the second depth is greater than 30 m. A method and apparatus includes: towing a first source with a source vessel; towing a second source with a survey vessel, the first source and the second source being separated by at least 5 km; towing a streamer spread at a first depth with the survey vessel; towing a pair of long-offset streamers at a second depth, wherein: the first depth is between 10 m and 30 m, and the second depth is greater than 30 m; acquiring long-offset data with long-offset sensors distributed along the long-offset streamers; and constructing a velocity model with the long-offset data. A method and apparatus includes: towing a first plurality of streamers at a first depth of 10 m to 30 m; receiving first signals generated by a first source with the first plurality of streamers; towing a second plurality of streamers at a second depth of greater than 30 m; while receiving the first signals, receiving second signals generated by a second source with the second plurality of streamers; wherein: the first source and the second source are separated by at least 5 km, the second signals represent long-offset data, and a forwardmost receiver on each of the second plurality of streamers has a same inline offset from the first source as a forwardmost receiver on each of the first plurality of streamers.

32 Claims, 10 Drawing Sheets

(56) References Cited

U.S. PATENT DOCUMENTS

| | | |
|---|---|---|
| 4,693,336 A | 9/1987 | Newman |
| 4,914,636 A | 4/1990 | Garrotta |
| 4,970,696 A | 11/1990 | Crews et al. |
| 5,083,297 A | 1/1992 | Ostrander |
| 5,148,406 A | 9/1992 | Brink et al. |
| 5,345,522 A | 9/1994 | Vali et al. |
| 5,424,999 A | 7/1995 | Manin |
| 5,761,152 A * | 6/1998 | Jacobsen ............... G01V 1/3808 367/20 |
| 5,973,995 A | 10/1999 | Walker et al. |
| 6,510,390 B1 | 1/2003 | Bunting et al. |
| 6,925,386 B2 | 8/2005 | Pramik et al. |
| 7,123,543 B2 | 10/2006 | Vaage et al. |
| 7,379,386 B2 | 5/2008 | Muyzert et al. |
| 7,450,467 B2 | 11/2008 | Tveide et al. |
| 7,577,060 B2 | 8/2009 | Toennessen et al. |
| 7,957,221 B2 | 6/2011 | Kluver et al. |
| 8,873,332 B2 | 10/2014 | Mandroux et al. |
| 8,908,469 B2 | 12/2014 | Hill et al. |
| 9,019,796 B2 | 4/2015 | Guevel et al. |
| 9,075,162 B2 | 7/2015 | Baardman et al. |
| 9,103,943 B2 | 8/2015 | Cowlard et al. |
| 9,250,345 B2 | 2/2016 | Mattsson |
| 9,261,619 B2 | 2/2016 | Mandroux et al. |
| 9,310,503 B2 | 4/2016 | Rentsch et al. |
| 9,360,575 B2 | 6/2016 | Etienne et al. |
| 9,405,029 B2 | 8/2016 | Howieson et al. |
| 9,429,667 B2 | 8/2016 | Vyas et al. |
| 9,513,391 B2 | 12/2016 | Keers et al. |
| 9,599,735 B2 | 3/2017 | Oscarsson |
| 9,651,695 B2 | 5/2017 | Lu et al. |
| 9,733,376 B2 | 8/2017 | Landais et al. |
| 9,772,418 B2 | 9/2017 | Sykes |
| 9,880,047 B2 | 1/2018 | Martin et al. |
| 9,880,048 B2 | 1/2018 | Martin et al. |
| 9,897,713 B2 | 2/2018 | Vageskar et al. |
| 9,910,176 B2 | 3/2018 | McKey, III |
| 9,932,093 B2 | 4/2018 | Sudow et al. |
| 9,958,564 B2 | 5/2018 | Grenie et al. |
| 10,001,576 B2 | 6/2018 | Grenie et al. |
| 10,031,248 B2 | 7/2018 | Bernitsas et al. |
| 10,042,073 B2 | 8/2018 | Bjornemo et al. |
| 10,054,705 B2 | 8/2018 | Hillesund et al. |
| 10,073,184 B2 | 9/2018 | Faber et al. |
| 10,094,942 B2 | 10/2018 | Brenders et al. |
| 10,139,269 B2 | 11/2018 | Den Boer et al. |
| 10,139,511 B2 | 11/2018 | Mensch |
| 10,234,585 B2 | 3/2019 | Long |
| 10,267,939 B2 | 4/2019 | Eick et al. |
| 10,281,602 B2 | 5/2019 | Moldoveanu et al. |
| 10,338,258 B2 | 7/2019 | Chalenski |
| 10,379,256 B2 | 8/2019 | Adams et al. |
| 10,459,100 B2 | 10/2019 | Hegna |
| 10,479,455 B2 | 11/2019 | Toennessen |
| 10,557,761 B2 | 2/2020 | Molteni et al. |
| 10,627,534 B2 | 4/2020 | Bernitsas |
| 10,712,463 B2 | 7/2020 | Leveille et al. |
| 11,480,700 B2 | 10/2022 | Siliqi et al. |
| 2006/0133200 A1 | 6/2006 | Tenghamn |
| 2008/0137480 A1 | 6/2008 | MacNeill |
| 2009/0147620 A1 | 6/2009 | Pan et al. |
| 2009/0296518 A1 | 12/2009 | MacNeill et al. |
| 2009/0296520 A1 | 12/2009 | Keers et al. |
| 2010/0313659 A1 | 12/2010 | Berg et al. |
| 2011/0090760 A1 | 4/2011 | Rickett et al. |
| 2011/0199857 A1 | 8/2011 | Garden |
| 2011/0305107 A1 | 12/2011 | Eick et al. |
| 2012/0014212 A1 | 1/2012 | Eick et al. |
| 2012/0020184 A1 | 1/2012 | Wilson et al. |
| 2012/0092956 A1 | 4/2012 | Soubaras |
| 2012/0227504 A1 | 9/2012 | Goldner et al. |
| 2013/0114373 A1* | 5/2013 | Mandroux ............ G01V 1/3808 367/16 |
| 2013/0170316 A1 | 7/2013 | Mandroux |
| 2014/0160885 A1 | 6/2014 | Tenghamn |
| 2014/0198611 A1* | 7/2014 | Siliqi ................... G01V 1/3808 367/20 |
| 2014/0241118 A1* | 8/2014 | Landais ............... G01V 1/3808 367/15 |
| 2015/0003195 A1 | 1/2015 | Widmaier et al. |
| 2015/0009779 A1 | 1/2015 | Mandroux et al. |
| 2015/0078124 A1 | 3/2015 | Lu et al. |
| 2015/0234065 A1 | 8/2015 | Lecocq et al. |
| 2015/0241587 A1 | 8/2015 | Baardman et al. |
| 2015/0293250 A1 | 10/2015 | Baardman et al. |
| 2016/0097870 A1 | 4/2016 | Routh et al. |
| 2016/0131785 A1 | 5/2016 | Tonchia |
| 2016/0139284 A1 | 5/2016 | Meech |
| 2016/0187504 A1 | 6/2016 | Brenders et al. |
| 2016/0202378 A1 | 7/2016 | Ridsdill-Smith et al. |
| 2016/0245941 A1 | 8/2016 | Ronholt et al. |
| 2016/0356907 A1 | 12/2016 | Mensch |
| 2016/0363682 A1 | 12/2016 | Grenie et al. |
| 2017/0075010 A1* | 3/2017 | Mandroux ........... G01V 1/3808 |
| 2017/0075011 A1 | 3/2017 | Ni et al. |
| 2017/0168178 A1 | 6/2017 | Crawley et al. |
| 2017/0176636 A1 | 6/2017 | Adams et al. |
| 2017/0205520 A1 | 7/2017 | Moldoneanu et al. |
| 2017/0285197 A1* | 10/2017 | Bernitsas ............. G01V 1/3808 |
| 2017/0363760 A1 | 12/2017 | Mensch et al. |
| 2017/0371069 A1 | 12/2017 | Malling |
| 2018/0002526 A1 | 1/2018 | Hillesund |
| 2018/0156933 A1* | 6/2018 | Ahmed .................. G01V 1/306 |
| 2018/0164456 A1 | 6/2018 | Chalenski |
| 2018/0164457 A1 | 6/2018 | Beitz et al. |
| 2018/0172856 A1 | 6/2018 | Hillesund |
| 2018/0274953 A1 | 9/2018 | Molteni |
| 2019/0064380 A1 | 2/2019 | Sharma |
| 2019/0154858 A1 | 5/2019 | Long |
| 2020/0393590 A1 | 12/2020 | Tenghamn |
| 2021/0124073 A1 | 4/2021 | Tenghamn |
| 2021/0124074 A1 | 4/2021 | Tenghamn |
| 2021/0141117 A1 | 5/2021 | Tenghamn et al. |
| 2023/0273334 A1 | 8/2023 | Cramer et al. |

FOREIGN PATENT DOCUMENTS

| | | |
|---|---|---|
| EP | 3 088 919 A1 | 11/2016 |
| EP | 3101451 A1 | 12/2016 |
| GB | 1 506 189 | 4/1978 |
| GB | 2 394 051 A | 4/2004 |
| GB | 2 404 025 A | 1/2005 |
| GB | 2 425 596 A | 11/2006 |
| GB | 2 460 073 A | 11/2009 |
| GB | 2 491 260 A | 11/2012 |
| GB | 2 494 040 A | 2/2013 |
| GB | 2 497 645 A | 6/2013 |
| GB | 2515658 A | 12/2014 |
| GB | 2 536 052 A | 9/2016 |
| GB | 2 567 059 A | 4/2019 |
| GB | 2 589 011 A | 5/2021 |
| GB | 2 599 849 A | 4/2022 |
| WO | 96 18117 A1 | 6/1996 |
| WO | 2009 131 619 A2 | 10/2009 |
| WO | 2012 054 635 A2 | 4/2012 |
| WO | 2014 022 346 A1 | 2/2014 |
| WO | 2014161044 A1 | 10/2014 |
| WO | 2015011247 A1 | 1/2015 |
| WO | 2015 195 939 A1 | 12/2015 |
| WO | 2016 011 250 A1 | 1/2016 |
| WO | WO-2016009270 A1 * | 1/2016 ............. G01V 1/005 |
| WO | 2017 102 289 A1 | 6/2017 |
| WO | 2017 195 093 A1 | 11/2017 |
| WO | 2018 217 872 A1 | 11/2018 |
| WO | 2018 229 553 A1 | 12/2018 |
| WO | 2019 018 894 A1 | 1/2019 |
| WO | 2019 043 452 A1 | 3/2019 |
| WO | 2019246297 A1 | 12/2019 |

(56) References Cited

FOREIGN PATENT DOCUMENTS

| WO | 2020 008 259 A1 | 1/2020 |
|---|---|---|
| WO | 2022 016 049 A1 | 1/2022 |

OTHER PUBLICATIONS

Chemingui, N., et al.—"Full Waveform Inversion of Simultaneous Long-Offset Data," presented at EAGE Annual 81st Conference & Exhibition 2019, Jun. 3-6, 2019, London, UK, 5 pages.
Chemingui, Nizar, et al.—"Full waveform inversion of simultaneous long-offset data," AEGC 2019: From Data to Discovery—Perth, Australia, pp. 1-6.
Fromyr, Elvind—"Blended Acquisition—A potential step-change in geophysical flexibility and operational efficiency," prepared for presentation during the 15th International Congress of the Brazilian Geophysical Society held in Rio de Janeiro, Brazil, Jul. 31 to Aug. 3, 2017, pp. 1-4.
Long, A.S., et al.—"Simultaneous Long Offset (SLO) Towed Streamer Seismic Acquisition" white paper, Jun. 2013, 5 pages.
PGS Geophysical—"Continuous Long Offset (CLO) Acquisition Technology," PGS Tech Link, vol. 6, No. 4, Apr. 2006, pp. 1-4.
PGS Geophysical—"Multi-Vessel Configurations" webpage, https://www.pgs.com/marine-acquisition/tools-and-techniques/acquisition, printed Oct. 19, 2019, 6 pages.
GB Examination Report in GB2017036.1 dated Apr. 22, 2021.
GB Examination Report in GB2017036.1 dated Sep. 20, 2021.
GB Examination Report in GB1813957.6 dated Nov. 8, 2021.
GB Examination Report in GB2100684.6 dated Jan. 25, 2022.
GB Examination Report in GB2017036.1 dated Feb. 14, 2022.
GB Examination Report in GB2203858.2 dated Apr. 1, 2022.
GB Examination Report in GB2100684.6 dated May 11, 2022.
GB Examination Report in GB2017036.1 dated Jun. 17, 2022.
GB Search Report in GB1813957.6 dated Jan. 24, 2019.
GB Examination Report in GB2017061.9 dated Jul. 14, 2023.
International Search Report and Written Opinion in PCT/US2019/38035 dated Sep. 9, 2019.
International Search Report and Written Opinion in PCT/US2021/041957 dated Oct. 27, 2021.
A. Long, "Increasing Towed Streamer Survey Efficiency", Aug. 18, 2018, accessed by web https://www.pgs.com/globalassets/1echnical-library/tech-lib-pdfs/industry_insights_increasing-towed-streamer-survey-efficiency_aug2018_al.pdf, 15 pages.
Alfaro, et al., "Reducing Exploration Risk," Oilfield Review, Spring 2007 Issue, pp. 26-43 {Schlumberger, Spring 2007).
Brenders, Andrew et al., "Realistic Signal-to-Noise Ratios for Synthetic Seismic Data: Calibrating with Measured Noise and Applications to Waveform Inversion", SEG International Exposition and 86th Annual Meeting, pp. 3992-3996, copyright 2016 SEG, 5 p.
Brenders, Drew et al., Realistic signal-to-noise ratios for synthetic seismic data: Calibrating with measured noise and applications to waveform inversion, Presentation, Society of Exploration Geophysicists, 49 pages.
Cortland Company Brochure, Seismic Tow Cables, Umbilicals, Straps and Ropes, 7 pages.
Dellinger, Joe et al., "Challenges to extending the usable seismic bandwidth at the seafloor in the deep water GoM", SEG International Exposition and 86th Annual Meeting, pp. 66-70, Copyright 2016 SEG, 5 pages.
Dellinger, Joe et al., "Challenges to extending the usable seismic bandwidth at the seafloor in the deep water GoM", Presentation, Society of Exploration Geophysicists, 50 pages.
Dellinger, Joe et al., Wolfspar®, an "FWI-friendly" ultra-low-frequency marine seismic source, SEG International Exposition and 86th Annual Meeting, pp. 4891-4895, Copyright 2016 SEG, 5 pages.
Dellinger, Joe et al., Wolfspar®, an "FWI-friendly" ultra-low-frequency marine seismic source, Presentation, Society of Exploration Geophysicists, 47 pages.
Duey, "All in One, Vessel Deploys Dtreamers and Nodes while Provising Sources" E&P Nov. 2017.
Karlsson, et al., "Multivessel Surveying Reduces Seismic Cost, Acquisition Time," Offshore, vol. 51, No. 3, Abstract (Petroleum Publishing Co. Mar. 1, 1991).
Lambert, et al., "Seismic Acquisition: Marine seismic survey positioning and control requirements evolve," Offshore Magazine, Mar. 1, 2003, 10 pages.
Long, "Evolutions in seismic azimuth: past, present and future," Geohorizons, Jul. 2009, pp. 1-14.
Long, et al. "Simultaneous Long Offset {SLO) Towed Streamer Seismic Acquisition," ASEG Extended Abstracts, J013:1, 1-4 {ASEG, Feb. 12, 2019).
Lopez, et al., "Fully Autonomous Marine Seismic Acquisition Systems for Rerservoir Monitoring," prepared or presentation during the 16th International Congress of the Brazilian Geophysical Society held in Rio de Janeiro, Brazil, Aug. 19-22, 2019, pp. 1-5.
Mensch, et al., "Acquisition of Long-Offset Data Offshore Gabon Shows How Synchronized Source Technology Adds Flexibility to Tailored Acquisition Solutions," First Break, vol. 34, Nov. 2016 {EAGE, Nov. 2016).
Molteni, et al., "Use of distributed fibre—Optic sensing for marine seismic measurements," Special Topic: Petroleum Geology and Basins, First Break (EAGE publication), vol. 34, Dec. 2016, pp. 53-60.
PGS Article, "3D Spread Control", Control of streamer depth and lateral position, Sep. 6, 2018, accessed by web, https://www.pgs.com/marine-acquisition/tools-and-techniques/operational-efficiency/technology/slreamer-steering/, 3 pages.
PGS Article, "Ramform + Triple Source= Ultra HD3D", Jun. 1, 2018, accessed by web https://www.pgs.com/publications/feature-stories/ramform-plus-lriple-source-equals-ultra-hd3d/, 5 pages.
Poole, et al., "Shot-to-shot directional designature using near-field hydrophone data," SEG Houston 2013 Annual Meeting, 5 pages.
Press Release, "SeaBird to enter into a strategic cooperation with PGS for deep water node seismic and to issue a NOK 240 million convertibel loan to PGS" (Cyprus Jan. 27, 2011).
Tapie, et al., "Optimizing Seismic Survey Design for Frontier Exploration in Cyprus Sall Basins," SEG I MPG nlemalional Meeting for Applied Geoscience and Energy {Aug. 31, 2023).
Tham, et al., "A Cost-Effective and Efficient Solution for Marine Seismic Acquisition in Obstructed Areas—Acquiring Ocean-Bottom and Towed-Streamer Seismic Data with a Single Multipurpose Vessel," 2017 SEG Workshop: OBN/OBC Technologies and Applications (SEG 2017).
Unger, et al., "Exploration: Redefining Multi-Azimuth Seismic Acquisition," https://www.hartenergy.com/ xclusives/redefining-multi-azimuth-seismic-acquisition-187435, May 2020, 5 pages.
Van Borselen, et al., "Simultaneous Long Offset {SLO)—A Case Study in Long Offset GeoStreamer Seismic /\cquisition & Processing," 6th EAGE Saint Petersburg International Conference and Exhibition, vol. 2014, pp. 1-5 EAGE, Apr. 2014).
Vermeer, "Wide-Azimuth Towed Streamer Data Acquisition and Simultaneous Sources," The Leading Edge, vol. 28, ssue 8, pp. 260-268 {SEG, Aug. 2009).
U.S. Appl. No. 18/377,237, filed Oct. 5, 2023, titled "Extended Long Offset Acquisition with Constant or Dynamically Adjusted Offset Coverage Gap".
AU Examination Report in AU2019290138 dated Jan. 16, 2024.
International Search Report and Written Opinion in PCT/EP2023/078366 dated Feb. 2, 2024.

\* cited by examiner

US 12,072,461 B2

MODIFIED SIMULTANEOUS LONG-OFFSET ACQUISITION WITH IMPROVED LOW FREQUENCY PERFORMANCE FOR FULL WAVEFIELD INVERSION

CROSS REFERENCE TO RELATED APPLICATIONS

This application claims benefit of U.S. Provisional Patent Application Ser. No. 62/926,958, filed Oct. 28, 2019, entitled "Modified Simultaneous Long Offset Acquisition with Improved Low Frequency Performance for Full Wavefield Inversion," which is incorporated herein by reference.

BACKGROUND

This disclosure is related generally to the field of marine surveying. Marine surveying can include, for example, seismic and/or electromagnetic surveying, among others. For example, this disclosure may have applications in marine surveying in which one or more sources are used to generate energy (e.g., wavefields, pulses, signals), and geophysical sensors—either towed or ocean bottom—receive energy generated by the sources and possibly affected by interaction with subsurface formations. Geophysical sensors may be towed on cables referred to as streamers. Some marine surveys locate geophysical sensors on ocean bottom cables or nodes in addition to, or instead of, streamers. The geophysical sensors thereby collect survey data (e.g., seismic data, electromagnetic data) which can be useful in the discovery and/or extraction of hydrocarbons from subsurface formations.

Some marine surveys deploy sources and receivers at long offsets to better acquire certain types of survey data. For example, long offsets may be beneficial for sub-salt and pre-salt imaging. Such long-offset surveys typically utilize ocean bottom cables or nodes. As another example, some very-low-frequency (e.g., as low as 1.6 Hz) sources may utilize receivers at long offsets (e.g., about 15 km-about 40 km) to acquire survey data optimized for full-waveform inversion (FWI). As another example, continuous long-offset (CLO) acquisition combines a dual source-vessel operation using only short streamers with a smart recording technique involving overlapping records. While dual source-vessel operations can increase the offset to effectively twice the streamer length, the inline shot spacing is also doubled in comparison to conventional single source-vessel operations. Simultaneous long-offset (SLO) acquisition modifies CLO acquisition by utilizing simultaneous shooting of forward and rear source vessels to halve the CLO inline shot spacing. Conventionally, SLO acquisition templates include towing streamers at standard streamer towing depths (e.g., about 10 m to about 30 m).

The results of marine surveys that acquire survey data for FWI may be improved by utilizing low-frequency data having good signal-to-noise ratio. Improved equipment and methods for acquiring low-frequency data, low-noise data, and/or long-offset data would be beneficial.

BRIEF DESCRIPTION OF THE DRAWINGS

So that the manner in which the features of the present disclosure can be understood in detail, a more particular description of the disclosure may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Figure 1:
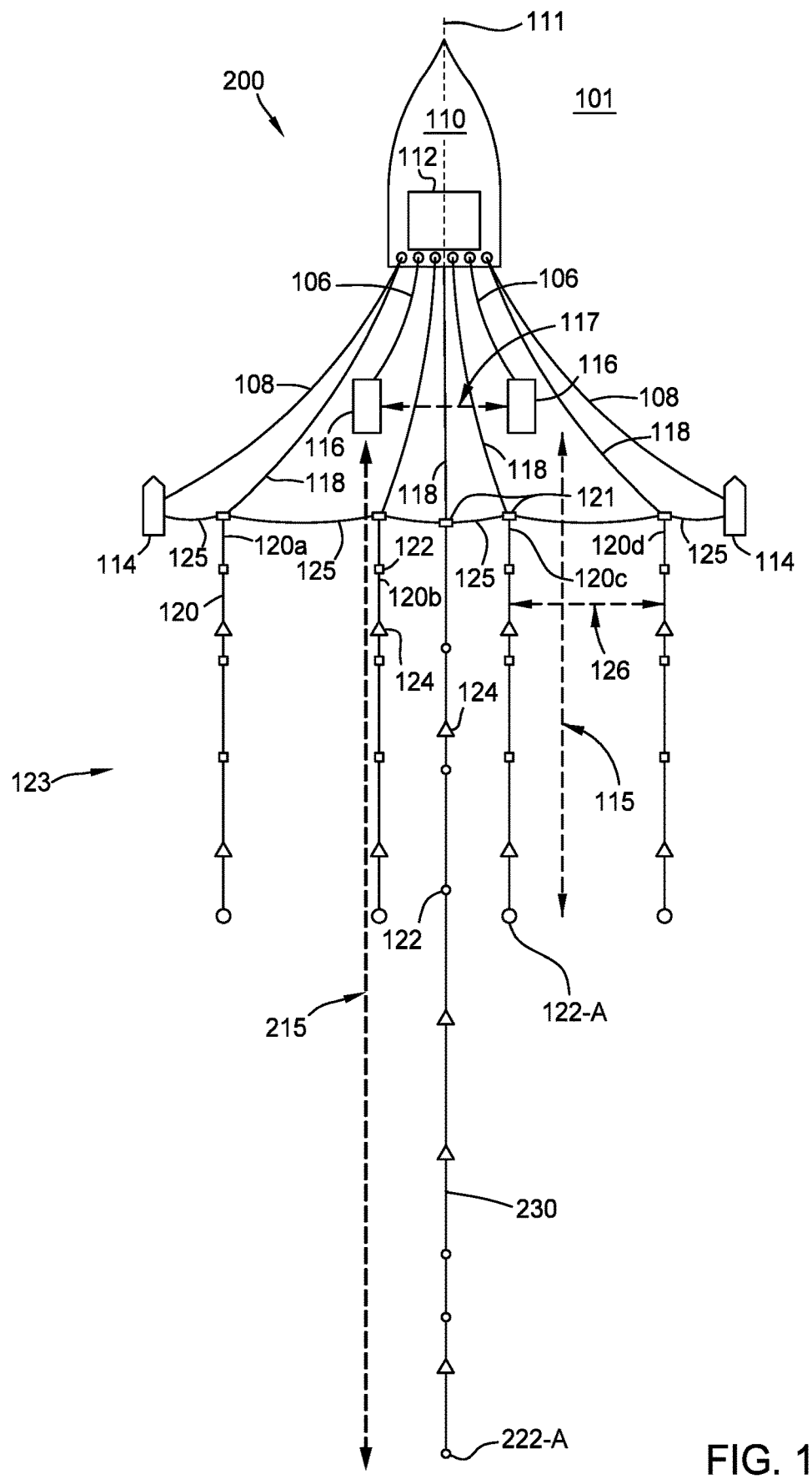
FIG. 1 illustrates an exemplary embodiment of a marine geophysical survey system configured for long-offset acquisition.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about +−10% variation. The term "nominal" means as planned or designed in the absence of variables such as wind, waves, currents, or other unplanned phenomena. "Nominal" may be implied as commonly used in the field of marine surveying.

"Axial direction" shall mean, for an object or system having a canonical axis, a direction along a proximal portion of the axis.

"Lateral direction" shall mean, for an object or system having a canonical axis, a direction perpendicular to a proximal portion of the axis. Often, "lateral direction" is understood to be at a fixed depth.

"Inline direction" shall mean, for equipment towed by a vessel, a direction along (or parallel to) the path traversed by the vessel.

"Crossline direction" shall mean, for equipment towed by a vessel, a fixed-depth direction perpendicular to the path traversed by the vessel.

"Offset" shall mean the nominal inline distance between the source and the receiver.

"Cable" shall mean a flexible, axial load carrying member that also comprises electrical conductors and/or optical conductors for carrying electrical power and/or signals between components.

"Rope" shall mean a flexible, axial load carrying member that does not include electrical and/or optical conductors. Such a rope may be made from fiber, steel, other high strength material, chain, or combinations of such materials.

"Line" shall mean either a rope or a cable.

"Source vessel" shall mean a watercraft, manned or unmanned, that is configured to carry and/or tow, and in practice does carry and/or tow, one or more geophysical sources. Unless otherwise specified, source vessels should be understood to not carry or tow one or more geophysical streamers.

"Streamer vessel" shall mean a watercraft, manned or unmanned, that is configured to tow, and in practice does carry and/or tow, one or more geophysical streamers. Unless otherwise specified, streamer vessels should be understood to not carry or tow one or more geophysical sources.

"Survey vessel" shall mean a watercraft, manned or unmanned, that is configured to tow, and in practice does carry and/or tow, one or more geophysical sources and/or one or more geophysical streamers.

"Buoyancy" of an object shall refer to buoyancy of the object taking into account any weight supported by the object.

"Forward" or "front" shall mean the direction or end of an object or system that corresponds to the intended primary direction of travel of the object or system.

"Aft" or "back" shall mean the direction or end of an object or system that corresponds to the reverse of the intended primary direction of travel of the object or system.

"Port" and "starboard" shall mean the left and right, respectively, direction or end of an object or system when facing in the intended primary direction of travel of the object or system.

"Obtaining" data shall mean any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

The term "simultaneous" does not necessarily mean that two or more events occur at precisely the same time or over exactly the same time period. Rather, as used herein, "simultaneous" means that the two or more events occur near in time or during overlapping time periods. For example, the two or more events may be separated by a short time interval that is small compared to the duration of the surveying operation. As another example, the two or more events may occur during time periods that overlap by about 40% to about 100% of either period.

Full wavefield inversion (FWI) refers to data acquisition and/or processing techniques that include simulating seismic source energy, propagating the energy (as a wavefield) through a model of the area being surveyed, making simulated measurements of the propagated energy, comparing the simulated seismic measurements with the actual seismic measurements, and iteratively updating the model according to a loss function based on the comparison. In some embodiments, the complexity of calculating the wavefield propagation may limit the amount of frequencies that are useful for FWI. In some embodiments, limiting the frequencies used in the simulation may increase the speed of calculating and/or the accuracy with which the iterative modeling converges. Consequently, marine surveying may advantageously collect data primarily representative of signals having the frequencies which are the most useful for FWI. For example, the desired frequencies may be lower frequencies, e.g. below 25 Hz, below 15 Hz, below 10 Hz, below 8 Hz, below 2 Hz, etc.

If there is any conflict in the usages of a word or term in this specification and one or more patent or other documents that may be incorporated herein by reference, the definitions that are consistent with this specification should be adopted for the purposes of understanding this disclosure.

The present disclosure generally relates to marine seismic and/or electromagnetic survey methods and apparatuses, and, at least in some embodiments, to novel surveying system configurations, and their associated methods of use. At least one embodiment of the present disclosure can provide long-offset data using one or more towed streamers for improved low-frequency data acquisition with simultaneous long-offset (SLO) acquisition. In some embodiments, standard SLO surveying configurations may be modified by varying streamer depth, varying offsets, and/or varying group lengths. This improved low-frequency data may improve results from full waveform inversion (FWI) over processing data collected with conventional technology.

In some embodiments, long-offset (e.g., greater than about 12 km offset) surveying is utilized for FWI. In some embodiments, FWI may utilize data that is recorded at low frequencies and/or with low noise. Some embodiments may advantageously improve signal-to-noise ratio (S/N) of recorded data by adding data from selected recording groups together and/or towing recording sensors at various depths. For example, depending on the recording frequencies of interest, a different towing depth may be utilized, and/or a different recording group length may be selected.

One of the many potential advantages of the embodiments of the present disclosure is that low-frequency data (e.g., low-frequency seismic data) may be acquired with high signal-to-noise ratio (i.e., with low noise). Another potential advantage includes acquiring survey data at long offsets and/or group lengths. Another potential advantage includes selection of towing depth, offset, and/or group length (e.g., long-offset seismic data) to produce a data set with desired frequency and noise characteristics. Another potential advantage includes acquiring long-offset data, including low-frequency/long-offset data, useful for FWI. It should be appreciated that data acquired at standard survey offsets may be too noisy below about 3 Hz for FWI. Embodiments of the present disclosure can thereby be useful in the discovery and/or extraction of hydrocarbons from subsurface formations.

In some embodiments, long-offset streamers may be towed in conjunction with a standard-offset survey spread. In some embodiments, the towing depth of the long-offset streamers may be at least double the towing depth of the receivers on the standard-offset survey spread. In some embodiments, the number of long-offset streamers may be much less than the number of streamers in the standard-offset survey spread. In some embodiments, the long-offset streamers may specifically acquire low-frequency data (e.g., low-frequency seismic signals).

At least one embodiment of the present disclosure can provide long-offset data for velocity model building using one or more towed streamers, for instance to provide low-frequency data for FWI. For example, deep targets may be imaged by utilizing long-offset/low-frequency data with FWI to generate a velocity model for imaging. At least one embodiment of the present disclosure can provide long-offset data using a towed streamer for velocity model building as an alternative to ocean bottom nodes, for instance by combining long-offset acquisition with a separate source vessel forward of a marine three-dimensional (3D) survey vessel to provide increased offsets for FWI.

In some embodiments, long-offset (e.g., from about 10 km to about 40 km, or greater than about 12 km offset) surveying is utilized for FWI. In some embodiments, FWI may utilize data that is recorded at low frequencies and/or with low noise. Some embodiments may advantageously improve signal-to-noise ratio (S/N) of recorded data (compared to other acquisition and/or data processing means) by assembling (e.g., summing, averaging, normalizing) data from selected receiver groupings and/or towing recording sensors at various depths (e.g., about 30 m to about 200 m, or about 25 m to about 75 m, or about 45 m). For example, depending on the recording frequencies of interest, a different towing depth may be utilized, and/or a different recording group length may be selected.

FIG. 1 illustrates an exemplary embodiment of a marine geophysical survey system 200 configured for long-offset acquisition. System 200 includes survey vessel 110 that may be configured to move along a surface of body of water 101 (e.g., an ocean or a lake). In FIG. 1, survey vessel 110 tows two signal sources 116, four standard streamers 120, and one long-offset streamer 230. As used herein, the term "signal source" or "source element" refers to an apparatus that is configured to emit a signal (e.g., acoustic, electromagnetic, etc.) that may be at least partially reflected from one or more subsurface structures, and then detected and/or measured. As used herein, the term "streamer" refers to an apparatus (e.g., a cable) that may be towed behind a survey vessel (e.g., a source vessel or a streamer vessel) to detect such signals, and thus may include detectors, sensors, receivers, and/or other structures (e.g., hydrophones, geophones, electrodes, etc.) positioned along or within the streamer and configured to detect and/or measure the reflected signal. "Survey data" generally refers to data utilized by and/or acquired during a survey, including detected signals, seismic data, electromagnetic data, pressure data, particle motion data, particle velocity data, particle acceleration data, clock data, position data, depth data, speed data, temperature data, etc. The standard streamers 120 may be of conventional length. For example, each standard streamer 120 may be about 5 km to about 10 km long, or in some embodiments about 6 km to about 8 km long. System 200 may utilize signal sources 116 with standard streamers 120 to acquire standard-offset survey data (i.e., data acquired at offsets less than about 12 km).

Signal sources 116 are shown in FIG. 1 being towed by survey vessel 110 using source cables 106. Each of signal sources 116 may include sub-arrays of multiple individual signal sources. For example, signal source 116 may include a plurality of seismic sources, such as air guns or marine vibrators, and/or electromagnetic signal sources. As illustrated, the two signal sources 116 are distributed about a midline 111 of survey vessel 110. The midline 111 represents the tow path along the centerline of the survey vessel 110. As illustrated, the two signal sources 116 are distanced from one another by a nominal crossline source separation 117, which may be greater than, equal to, or less than nominal crossline streamer spacing 126. The signal sources 116 may be independently activated, activated simultaneously, activated in a sequential pattern, and/or activated randomly with respect to one another. In some embodiments (not shown), signal sources 116 may be distributed asymmetrically with respect to the midline 111 of survey vessel 110.

Standard streamers 120 may include a variety of receivers 122. Receivers 122 may include seismic receivers or sensors, such as hydrophones, pressure sensors, geophones, particle motion sensors, and/or accelerometers. Receivers 122 may include electromagnetic sensors, such as electrodes or magnetometers. Receivers 122 may include any suitable combination of these and/or other types of geophysical sensors. Standard streamers 120 may further include streamer steering devices 124 (also referred to as "birds") which may provide controlled lateral and/or vertical forces to standard streamers 120 as they are towed through the water, typically based on wings or hydrofoils that provide hydrodynamic lift. Standard streamers 120 may further include tail buoys (not shown) at their respective back ends. The number and distribution of receivers 122, streamer steering devices 124, and tail buoys along each standard streamer 120 may be selected in accordance with manufacturing and operational circumstances or preferences.

As illustrated in FIG. 1, standard streamers 120 are coupled to survey vessel 110 via standard lead-in lines 118 and lead-in terminations 121. Standard lead-in lines 118 may generally be about 750 m to about 1500 m, or more specifically about 1000 m to about 1200 m in total length. Typically, about half of the total length of standard lead-in line 118 will be in the water. For example, about 400 m-500 m of standard lead-in line 118 may be in the water during operation. Lead-in terminations 121 may be coupled to or associated with spreader lines 125 so as to nominally fix the lateral positions of standard streamers 120 with respect to each other and with respect to a centerline of survey vessel 110. Standard streamers 120a-120d may be nominally fixed in lateral positions with respect to each other in order to form a standard-offset survey spread 123 (e.g., a narrow azimuth spread, and/or a 3D acquisition spread) to collect standard-offset survey data as survey vessel 110 traverses the surface of body of water 101. In a standard-offset survey spread 123, the nominal crossline streamer spacing 126 may range from about 25 m to about 200 m, or in some embodiments about 100 m. As shown, system 200 may also include two paravanes 114 coupled to survey vessel 110 via paravane tow lines 108. Paravanes 114 may be used to provide a streamer separation force for standard-offset survey spread 123.

As illustrated in FIG. 1, standard-offset survey spread 123 may be towed at a nominal depth of about 10 m to about 30 m, or more particularly about 25 m. For example, the speed of survey vessel 110, length of standard lead-in lines 118, angle of paravanes 114, length of spreader lines 125, and/or any steering devices, tail buoys, and/or depth control buoys may be configured and/or operated to tow the standard streamers 120 at a nominal depth of about 10 m to about 30 m. It should be appreciated that streamers are generally towed at a nominal depth that may vary (e.g., by about ±5%) along the length of the streamer due to environmental factors (e.g., currents, water temperatures).

In various embodiments, a geophysical survey system may include any appropriate number of towed signal sources 116 and standard streamers 120. For example, FIG. 1 shows two signal sources 116 and four standard streamers 120. It should be appreciated that standard-offset survey spread 123 commonly includes as few as 2 and as many as 24 or more standard streamers 120, or in some embodiments ten standard streamers 120. In one embodiment, for example, survey vessel 110 may tow eighteen or more standard streamers 120. A geophysical survey system with an increased number of signal sources 116 and/or standard streamers 120 may allow for more survey data to be collected and/or a wider standard-offset survey spread 123 to be achieved. The width of a survey spread may be determined by the crossline streamer spacing 126 and the number of streamers in the survey spread. For example, standard-offset survey spread 123 may have a width of about 300 m to about 3 km, or in some embodiments about 900 m.

Geodetic position (or "position") of the various elements of system 200 may be determined using various devices, including navigation equipment such as relative acoustic ranging units and/or global navigation satellite systems (e.g., a global positioning system (GPS)).

Survey vessel 110 may include equipment, shown generally at 112 and for convenience collectively referred to as a "recording system." Recording system 112 may include devices such as a data recording unit (not shown separately) for making a record (e.g., with respect to time) of signals collected by various geophysical sensors. For example, in various embodiments, recording system 112 may be configured to record reflected signals detected or measured by receivers 122 while survey vessel 110 traverses the surface of body of water 101. Recording system 112 may also include a controller (not shown separately), which may be configured to control, determine, and record, at selected times, navigation and/or survey data, including the geodetic positions of: survey vessel 110, signal sources 116, standard streamers 120, receivers 122, etc. Recording system 112 may also include a communication system for communicating between the various elements of system 200, with other vessels, with on-shore facilities, etc.

As illustrated, standard-offset survey spread 123 has aft-most receivers 122-A. For example, each aft-most receiver 122-A may be at or near the aft-most end of a standard streamer 120. In the illustrated embodiment, an aft-most receiver 122-A is aft of each illustrated streamer steering device 124, but other configurations are possible. The inline distance between signal source 116 and aft-most receiver 122-A is the longest offset 115 of standard-offset survey spread 123. Typically, conventional marine geophysical survey spreads may have longest offsets of about 5 km to about 10 km, or in some embodiments about 6 km to about 8 km.

System 200 also includes a long-offset streamer 230. For example, each standard streamer 120 may be about 5 km to about 10 km long, while long-offset streamer 230 may be about 8 km to about 50 km long, or in some embodiments about 8 km to about 12 km long. As illustrated, long-offset streamer 230 is coupled to survey vessel 110 via a standard lead-in line 118 and a lead-in termination 121. In some embodiments, the lead-in termination 121 of long-offset streamer 230 may be coupled to or associated with spreader lines 125 so as to nominally fix the lateral positions of long-offset streamers 230 with respect to standard streamers 120. As with standard streamers 120, long-offset streamer 230 may include receivers 122, streamer steering devices 124, and tail buoys. The number and distribution of receivers 122, streamer steering devices 124, and tail buoys along long-offset streamer 230 may be selected in accordance with manufacturing and operational circumstances or preferences. In some embodiments, receivers 122 on long-offset streamer 230 may be low-frequency seismic receivers configured to detect and/or measure low-frequency seismic signals (e.g., about 1 Hz to about 30 Hz, or about 1 Hz to about 8 Hz). In some embodiments, system 200 may have an aft-most receiver 222-A providing a longest offset 215 of about 8 km to about 50 km, or in some embodiments about 8 km to about 12 km. System 200 may utilize signal sources 116 with long-offset streamer 230 to acquire long-offset survey data (i.e., data acquired at offsets greater than about 12 km).

As would be appreciated by one of ordinary skill in the art with the benefit of this disclosure, long streamer cables (e.g., longer than about 10 km) can pose several challenges. For example, the axial strength of a standard streamer cable may not be sufficient to withstand the towing forces incurred by a long streamer cable. As another example, increasing the length of streamer cables may increase drag, and thereby increase operational costs. As another example, the capacity of data buses in a standard streamer cable may not be sufficient for the data expected from a long streamer cable. For example, a long streamer cable may have many more receivers than a standard streamer cable, each acquiring data to be carried by the data buses. As another example, data signals along data buses in long streamer cables may require repeaters to boost the signal along the length of the long streamer cable. As another example, the capacity of power lines and/or power sources in a standard streamer cable may not be sufficient for the power demands expected from a long streamer cable. Moreover, low-frequency/long-offset data may be less useful for conventional imaging, especially 3D imaging, compared to high-frequency data.

Figure 2:
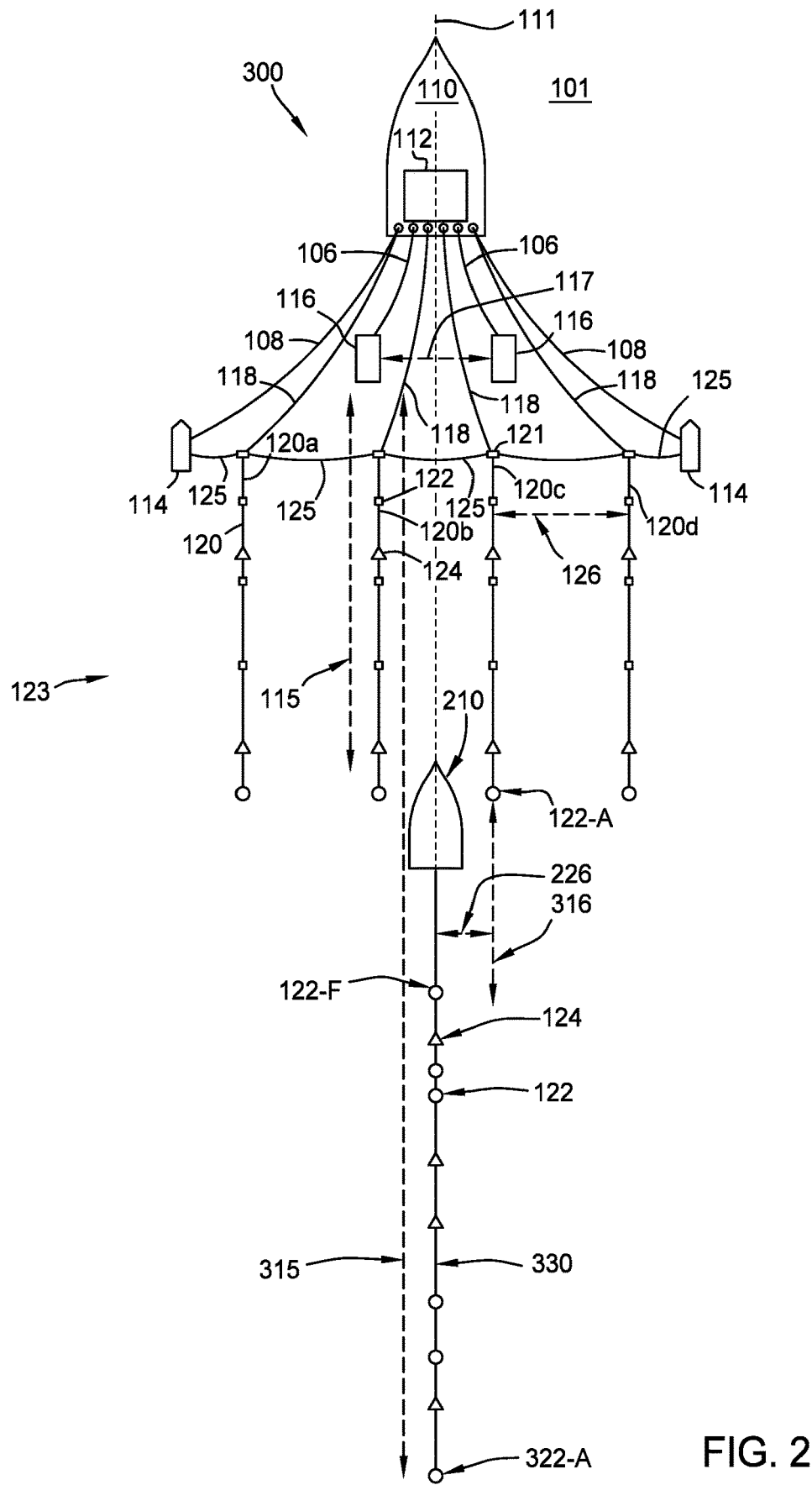
FIG. 2 illustrates another exemplary embodiment of a marine geophysical survey system configured for long-offset acquisition.

FIG. 2 illustrates another exemplary embodiment of a marine geophysical survey system 300 configured for long-offset acquisition. In many aspects, system 300 is configured similarly to system 200. However, system 300 includes a long-offset streamer 330 towed by long-offset streamer vessel 210 (e.g., a 2D vessel). Each standard streamer 120 may be about 5 km to about 12 km long. The inline distance between signal source 116 and aft-most receiver 122-A is the longest offset 115 of standard-offset survey spread 123. Typically, conventional marine geophysical survey spreads may have longest offsets of about 5 km to about 12 km, or in some embodiments about 6 km to about 8 km, while long-offset streamer 330 may be about 8 km to about 50 km long. As illustrated, long-offset streamer 330 is coupled to long-offset streamer vessel 210. For example, long-offset streamer 330 may be coupled to long-offset streamer vessel 210 via a lead-in line (not shown) and a lead-in termination (not shown). As with standard streamers 120, long-offset streamer 330 may include receivers 122, streamer steering devices 124, and/or tail buoys (not shown). The number and distribution of receivers 122, streamer steering devices 124, and/or tail buoys along long-offset streamer 330 may be selected in accordance with manufacturing and operational circumstances or preferences. In some embodiments, receivers 122 on long-offset streamer 330 may be low-frequency seismic receivers configured to detect and/or measure low-frequency seismic signals (e.g., about 1 Hz to about 30 Hz, or about 1 Hz to about 8 Hz). In some embodiments, system 300 may have an aft-most receiver 322-A providing a longest offset 315 of about 20 km to about 60 km, or in some embodiments about 30 km. System 300 may utilize signal sources 116 with standard streamers 120 to acquire standard-offset survey data, and system 300 may utilize signal sources 116 with long-offset streamer 330 to acquire long-offset survey data.

Long-offset acquisition with marine geophysical survey system 300 may provide multiple advantages over standard surveying configurations, including: very long offsets for FWI, reduced amount of equipment in water, reduced vessel effort since only an additional lead-in or 2D vessel is required, minimal additional source effort, reduced environmental impact, and improved S/N for the long offsets.

In some embodiments, communications equipment may be associated with long-offset streamer 330 for communicating (e.g., wirelessly) among various elements of the long-offset streamer, the system(s), other vessels, on-shore facilities, etc. For example, communications equipment may be included as a component of the long-offset streamer vessel, of the tail buoy(s), or of any other component associated with the long-offset streamer. The communications equipment may provide data communications between components of the system(s), such as between receivers 122 of the long-offset streamer and recording system 112 of survey vessel 110. For example, communications equipment may be useful for synchronizing shot times from signal sources 116 with recording times for data acquired by receivers 122 and/or recorded on the long-offset streamer vessel(s).

In some embodiments, long-offset streamer vessel 210 may be an unmanned watercraft, such as a remotely-operated vehicle (ROV) and/or a depth control buoy. For example, the long-offset streamer vessel may control the position and/or depth of a portion (e.g., the front end) of the long-offset and/or aft-ward streamer(s) and/or any lead-in line coupled thereto. In some embodiments, the long-offset streamer vessel is coupled to the long-offset streamer by a remotely controlled (e.g. radio-controlled) winch. For example, the long-offset streamer vessel and any winch thereon may be managed from an instrument room onboard the survey vessel 110. In some embodiments, the long-offset streamer vessel may be configured to communicate with the survey vessel 110. For example, the long-offset streamer vessel(s) may be configured to communicate with the survey vessel 110 to share data (e.g., survey data, seismic data, clock data, real-time data, and/or asynchronous uploaded data), to provide remote control of the position and/or depth of the long-offset streamer, and/or remote monitoring of technical information about the long-offset streamer vessel, such as humidity and voltage. In some embodiments, the long-offset streamer vessel and any winch thereon may be powered by an onboard power supply, which can include, for example, a battery and a power harvester, such as an underwater generator, that provides power to the battery, to allow the long-offset streamer vessel to be operated without maintenance for several months at the time.

As illustrated, system 300 may be configured and/or operated so that long-offset streamer 330 is towed along a midline 111 of the path of survey vessel 110. The crossline spread separation 226 may be expressed as a crossline distance between the long-offset streamer and a nearest standard streamer 120 of standard-offset survey spread 123. In some embodiments, the crossline spread separation 226 may be from about 0 m (e.g., in the case of a midline standard streamer 120) to about 100 m, or in some embodiments about 50 m. For example, long-offset streamer vessel(s) may navigate a survey path that nominally follows the survey path of survey vessel 110. As another example, any streamer steering devices 124 associated with the long-offset streamer may cause the long-offset streamer to nominally follow along the midline 111 of the path of survey vessel 110. Likewise, in some embodiments, the system(s) may be configured and/or operated so that the long-offset streamer are towed along a midline of the distributed signal sources 116. Likewise, in some embodiments, the system(s) may be configured and/or operated so that the long-offset and/or streamer are towed along a midline of the standard-offset survey spread 123.

In some embodiments, system 300 may be configured and/or operated so that the long-offset streamer is towed port-ward or starboard-ward of a midline of the path of survey vessel 110, the distributed signal sources 116, and/or the standard-offset survey spread 123. For example, the long-offset streamer may be towed between the midline of standard-offset survey spread 123 and an outermost (i.e., either port-most or starboard-most) standard streamers 120 thereof. In some embodiments, the long-offset streamer may be towed outside of standard-offset survey spread 123 (i.e., either port of the port-most, or starboard of the starboard-most, standard streamers 120 thereof). In some embodiments, the long-offset streamer vessel(s) may be operated to navigate a survey path that does not nominally follow the survey path of survey vessel 110, for example, to provide extended azimuthal and/or offset coverage.

As illustrated, system 300 may be configured and/or operated so that long-offset streamer 330 is towed near (e.g., within about 100 m) or at the aft-most point of standard-offset survey spread 123. The inline spread separation 316 may be expressed as an inline distance between an aft-most receiver 122-A of standard-offset survey spread 123 and a forward-most receiver 122-F of long-offset streamer 330. In some embodiments, the inline spread separation 316 may be from about −1 km (in the instance where the forward-most receiver 122-F of long-offset streamer 330 is closer to survey vessel 110 than aft-most receiver 122-A of standard-offset survey spread 123) to about 100 m. For example, long-offset streamer vessel 210 may navigate a survey path that nominally remains aft-ward of the aft-most point of standard-offset survey spread 123.

In some embodiments, long-offset streamer 330 is disposed at a different depth than standard-offset survey spread 123. For example, the long-offset streamer may have a nominal towing depth of greater than 30 m, such as about 30 m to about 200 m, or more particularly at a depth of about 45 m or at a depth of about 75 m, while standard-offset survey spread 123 may have a nominal towing depth of about 10 m to about 30 m, or more particularly about 25 m. As would be understood by one of ordinary skill in the art with the benefit of this disclosure, seismic streamers have been typically towed at shallow depths (e.g., about 10 m-about 15 m) due to concerns about streamer ghost notches in the amplitude spectrum within the seismic frequency range. The nominal towing depth may be achieved by one or more of: operating the long-offset streamer vessel(s) at a selected depth, constructing and/or adapting the long-offset streamer to be neutrally buoyant at a particular depth, equipping the long-offset streamer with one or more depth control devices (e.g., depressors) distributed at one or more points along the length of the long-offset streamer, and/or utilizing a tail buoy with active and/or passive depth control. In some embodiments, towing the long-offset streamer at a greater depth may provide improved low-frequency data acquisition, possibly at the expense of high frequency data acquisition by receivers 122 on the long-offset streamer. It is currently believed that low-frequency/long-offset data may be more beneficial than high-frequency/long-offset data for purposes such as FWI.

Figure 3:
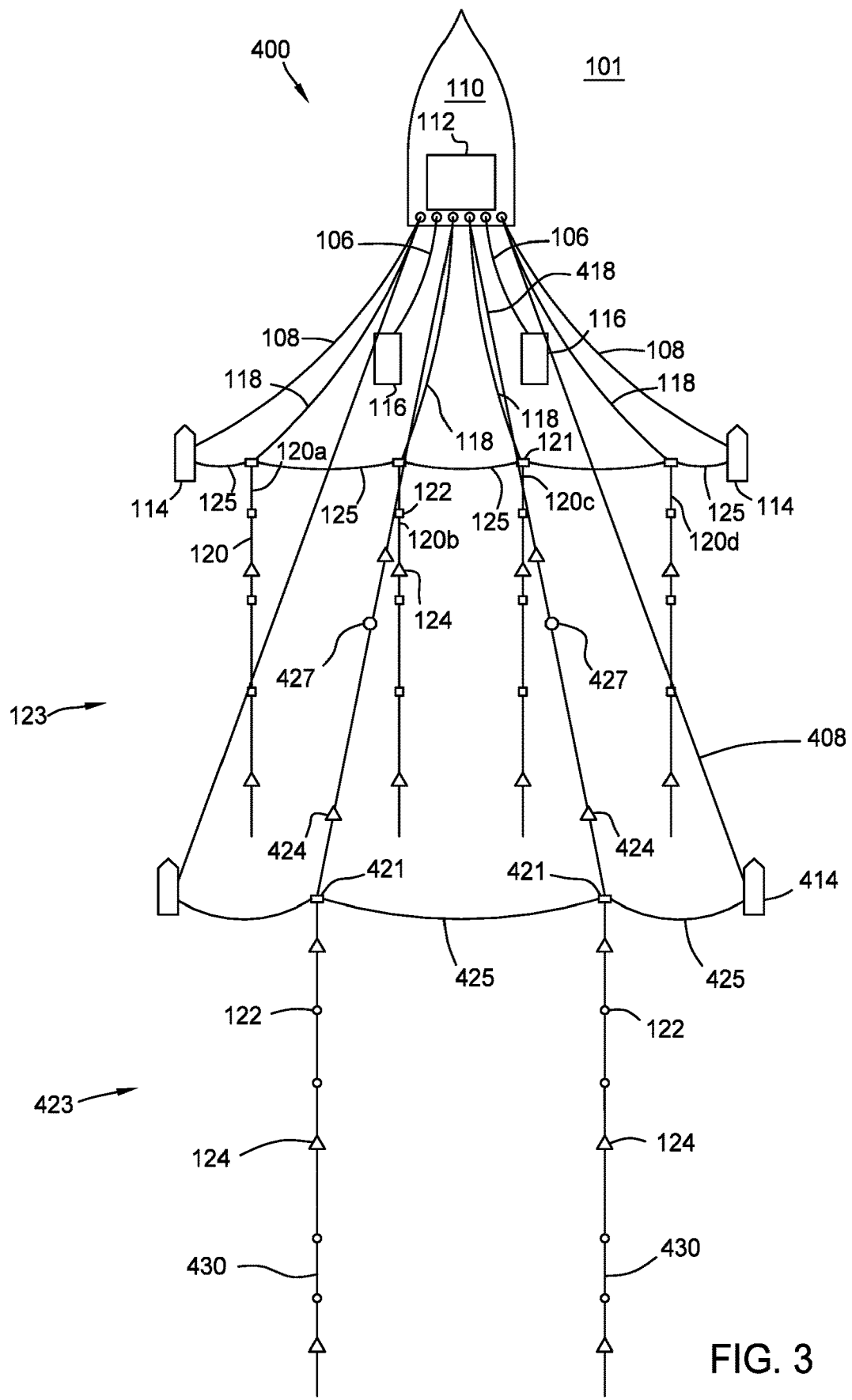
FIG. 3 illustrates another exemplary embodiment of a marine geophysical survey system configured for long-offset acquisition.

FIG. 3 illustrates another exemplary embodiment of a marine geophysical survey system 400 configured for long-offset acquisition. In many aspects, system 400 is configured similarly to systems 200 and 300. However, system 400 includes a long-offset survey spread 423 that includes two long-offset streamers 430. As illustrated, a long-offset lead-in line 418 couples between each of the long-offset streamers 430 and survey vessel 110. Each of the long-offset streamers 430 may be coupled to the respective long-offset lead-in line 418 with a long-offset lead-in termination 421. For example, each long-offset lead-in termination 421 may be configured to couple between the respective long-offset lead-in line 418 and long-offset streamer 430 aft of standard-offset survey spread 123. In some embodiments, each long-offset lead-in termination 421 may be configured to couple between the respective long-offset lead-in line 418 and long-offset streamer 430 aft of an inline midpoint of standard-offset survey spread 123. Long-offset lead-in terminations 421 may be coupled to or associated with long-offset spreader lines 425 so as to nominally fix the lateral positions of long-offset streamers 430 with respect to each other and with respect to a centerline of survey vessel 110. As shown, system 400 may also include two long-offset paravanes 414 coupled to survey vessel 110 via long-offset paravane tow lines 408. Long-offset paravanes 414 may be used to provide a streamer separation force for long-offset survey spread 423. In the illustrated embodiment, long-offset spreader lines 425 are towed aft of standard-offset survey spread 123. In some embodiments (e.g., when standard-offset survey spread 123 and long-offset survey spread 423 are towed at different depths), long-offset spreader lines 425 may be towed aft of spreader lines 125 but not aft of standard-offset survey spread 123. Long-offset lead-in lines 418 are not coupled to, and may be disposed at a different depth than, spreader lines 125. In some embodiments, long-offset lead-in line 418 may be about the same length as the length of a standard lead-in line 118 plus the length of a standard streamer 120. In some embodiments, long-offset lead-in line 418 may be longer or shorter than the combined length of standard lead-in line 118 and standard streamer 120. In some embodiments, long-offset streamer 430 may be about the same length as the length of a standard streamer 120. For example, long-offset lead-in line 418 may be about 5 km to about 20 km long, while long-offset streamer 430 may be about 8 km to about 50 km long. In some embodiments, long-offset streamer 430 may be longer or shorter than the length of standard streamer 120.

As with standard streamers 120, long-offset streamer 230, and long-offset streamer 330, long-offset streamers 430 may include receivers 122, streamer steering devices 124, and tail buoys. The number and distribution of receivers 122, streamer steering devices 124, and tail buoys along each long-offset streamer 430 may be selected in accordance with manufacturing and operational circumstances or preferences. In some embodiments, receivers 122 on long-offset streamer 430 may be low-frequency seismic receivers configured to detect and/or measure low-frequency seismic signals (e.g., about 1 Hz to about 8 Hz). System 400 may utilize signal sources 116 with standard streamers 120 to acquire standard-offset survey data, and system 400 may utilize signal sources 116 with long-offset streamers 430 to acquire long-offset survey data.

In some embodiments, long-offset lead-in line 418 may be positively or neutrally buoyant (e.g., have more buoyancy than standard lead-in line 118). For example, long-offset lead-in line 418 may be configured to float at or near (e.g. no more than about 10 m below) the surface of body of water 101. In some embodiments, the long-offset lead-in line 418 may be made of and/or filled with buoyant material. In some embodiments, the long-offset lead-in line 418 may have floatation devices attached along its length. As would be understood by one of ordinary skill in the art with the benefit of this disclosure, buoyant long-offset lead-in lines may provide several advantages. Drag is always a concern when equipment is towed behind a survey vessel. The length of long-offset lead-in lines 418 may make drag a heightened concern. However, buoyant long-offset lead-in lines may reduce drag by reducing the surface area exposed to water while towing. Additionally, as previously discussed, spreader lines 125 may nominally fix the lateral positions of standard streamers 120 and their associated standard lead-in lines 118. However, long-offset lead-in line 418 may not be coupled to spreader lines 125. Entanglement of the lead-in lines may be avoided by towing standard lead-in lines 118 (and spreader lines 125) at a different depth than long-offset lead-in line 418. Since standard lead-in lines 118 are typically towed about 10 m to about 30 m depth (to match the towing depths of their associated standard streamers 120), a buoyant long-offset lead-in line 418 may mitigate entanglement risks.

In some embodiments, long-offset lead-in lines 418 may include one or more lead-in steering devices 424. Similar to streamer steering devices 124, lead-in steering devices 424 may provide controlled lateral and/or vertical forces to long-offset lead-in lines 418 as they are towed through the water.

In some embodiments, each long-offset lead-in line 418 may be coupled to one or more depth control buoy(s) 427. For example, the depth control buoy 427 may be coupled to long-offset lead-in line 418 at, or forward of, long-offset lead-in termination 421. As another example, the depth control buoy 427 may be coupled to long-offset lead-in line 418 at, or forward of, spreader lines 125. As another example, the depth control buoy 427 may be coupled to long-offset lead-in line 418 near (e.g., within about 100 m) survey vessel 110. Depth control buoy 427 may control the depth of a portion (e.g., the front end) of long-offset lead-in line 418. In some embodiments, depth control buoy 427 is coupled to long-offset lead-in line 418 by a remotely controlled (e.g. radio-controlled) winch. For example, depth control buoy 427 and any winch thereon may be managed from an instrument room onboard the survey vessel 110. In some embodiments, the depth control buoy 427 may be configured to communicate with the survey vessel 110 to provide remote control of the depth of the long-offset lead-in line 418, and/or remote monitoring of technical information about the depth control buoy 427, such as humidity and voltage. In some embodiments, the winch may be powered by an onboard power supply, which can include, for example, a battery and a power harvester, such as an underwater generator, that provides power to the battery, to allow the depth control buoy 427 to be towed without maintenance for several months at the time.

Figure 4:
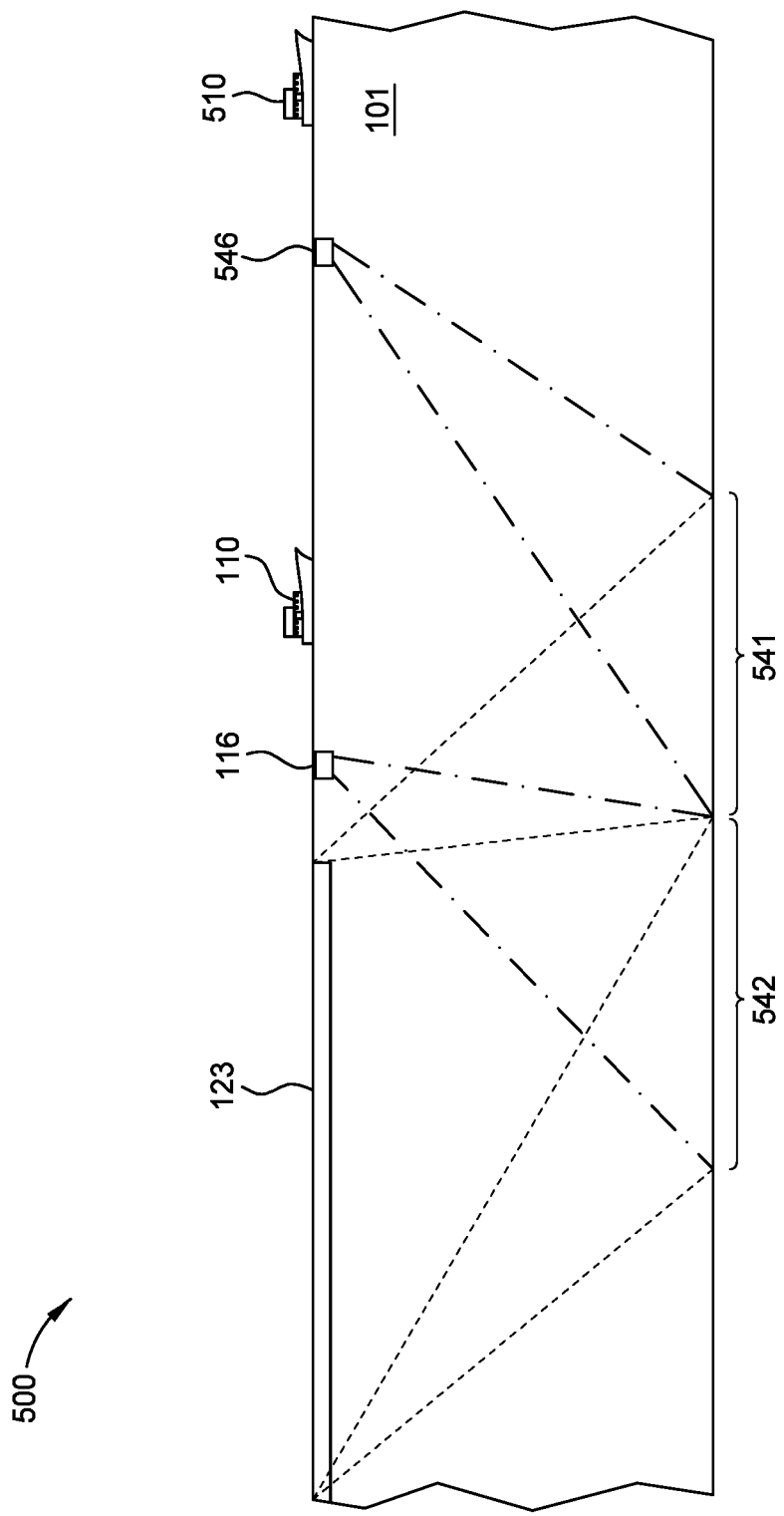
FIG. 4 illustrates another exemplary embodiment of a marine geophysical survey system configured for long-offset acquisition.

FIG. 4 illustrates an exemplary embodiment of a marine geophysical survey system 500 configured for SLO acquisition. Similar to system 100 of FIG. 1, survey vessel 110 tows a pair of signal sources 116 and a standard-offset survey spread 123. The energy from signal sources 116 illuminates a surveying area 542. As illustrated, system 500 also includes a source vessel 510 that tows a pair of signal sources 546. The energy from signal sources 546 illuminates a surveying area 541. The energy reflected from each of surveying area 541 and surveying area 542 is received by standard-offset survey spread 123. As illustrated, signal sources 546 towed by source vessel 510 are more distant from standard-offset survey spread 123 than the signal sources 116 towed by survey vessel 110. Therefore, the surveying area 541 is known as the "far-offset illumination," while the surveying area 542 is known as the "near-offset illumination." As illustrated, the standard-offset survey spread 123 is towed at standard streamer towing depths (e.g., about 10 m to about 30 m). System 500 may utilize signal sources 116 with standard-offset survey spread 123 to acquire standard-offset survey data, and system 500 may utilize signal sources 546 with standard-offset survey spread 123 to acquire long-offset survey data.

Figure 5:
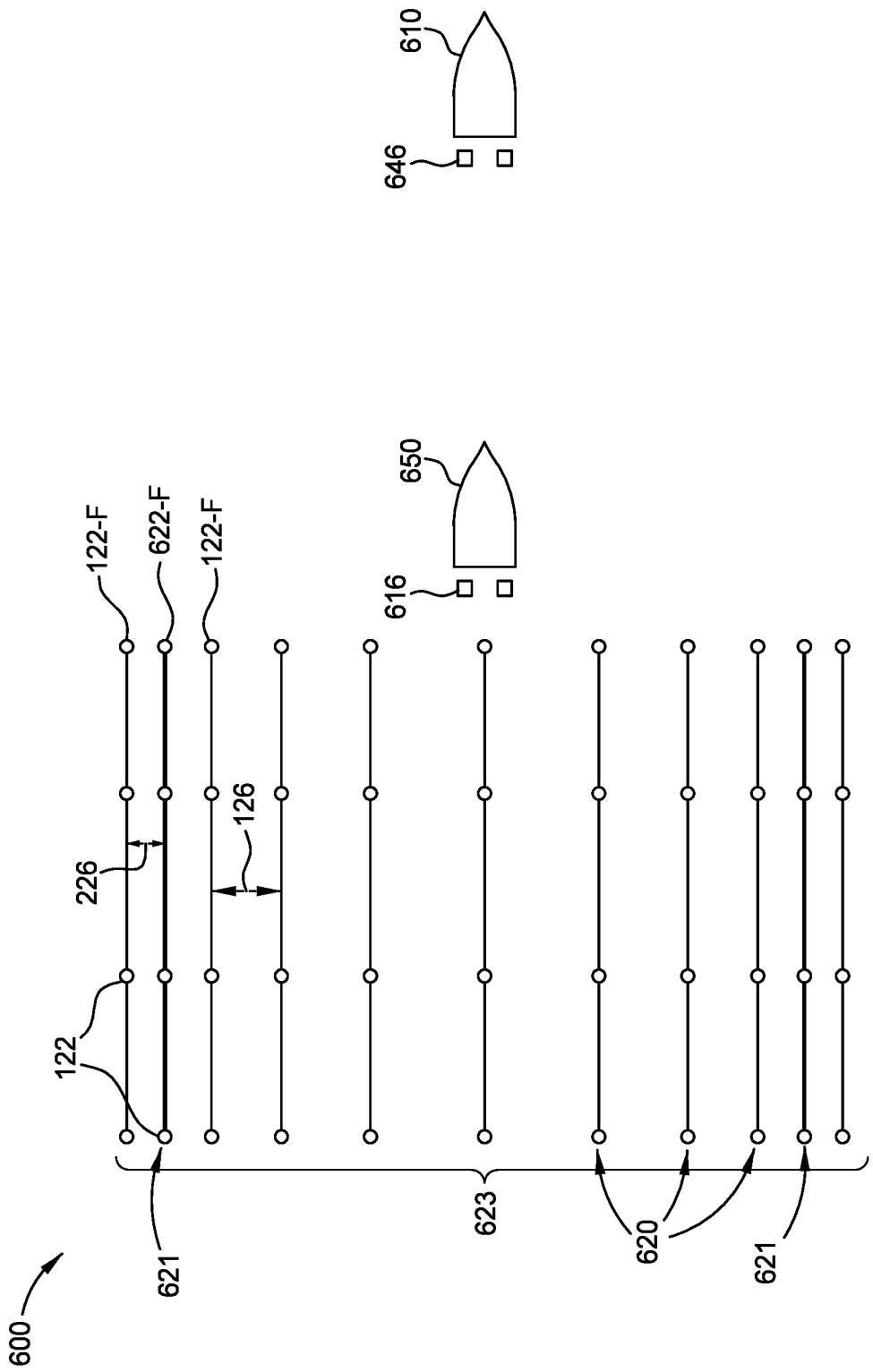
FIG. 5 illustrates another exemplary embodiment of a marine geophysical survey system configured for long-offset acquisition.

FIG. 5 illustrates an exemplary embodiment of a marine geophysical survey system 600 configured for modified SLO acquisition. Similar to system 500 of FIG. 4, survey vessel 650 tows a pair of signal sources 616 and a standard-offset survey spread 623. Standard-offset survey spread 623 may be configured similarly to the standard-offset survey spreads 123 of FIGS. 1-3. The energy from signal sources 616 illuminates a near-offset surveying area. The standard streamers 620 of standard-offset survey spread 623 may be configured similarly to standard streamers 120 of FIGS. 1-3, being about 5 km to about 10 km long, or in some embodiments about 6 km to about 8 km long. Standard-offset survey spread 623 may be towed at standard streamer towing depths (e.g., about 10 m to about 30 m). The nominal crossline streamer spacing 126 for standard-offset survey spread 623, may range from about 25 m to about 200 m, or in some embodiments about 100 m. Also similar to the system 500 of FIG. 4, system 600 includes a source vessel 610 that tows a pair of signal sources 646. The energy from signal sources 646 illuminates a far-offset surveying area. System 600 may utilize signal sources 616 with standard-offset survey spread 623 to acquire standard-offset survey data, and system 600 may utilize signal sources 646 with standard-offset survey spread 623 to acquire long-offset survey data.

The modified SLO acquisition configuration of system 600 also includes two long-offset streamers 621. As illustrated, the long-offset streamers 621 may be towed proximal the port-most and/or starboard-most standard streamers 620 of standard-offset survey spread 623. Consequently, the long-offset streamers 621 may be configured to acquire wide-azimuth data. In some embodiments, the crossline spread separation 226 may be from about 0 m (e.g., nominally aligned with the port-most or starboard-most standard streamer 620) to about 100 m, or in some embodiments about 50 m. In some embodiments, each long-offset streamer 621 may be towed nominally equidistant (e.g., same crossline spread separation 226 on either side of long-offset streamer 621) between two of the standard streamers 620 of standard-offset survey spread 623. In some embodiments, the long-offset streamers 621 may be towed at greater depths (e.g., about 30 m to about 200 m) than the standard streamers 620. It is currently believed that towing long-offset streamers 621 at greater depths than the standard streamers 620 may provide improved low-frequency data (e.g., data having a higher signal-to-noise ratio). This improved low-frequency data may improve results from full waveform inversion (FWI) over processing data collected with conventional technology. System 600 may utilize signal sources 616 with long-offset streamers 621 to acquire low-frequency, standard-offset survey data, and system 600 may utilize signal sources 646 with long-offset streamers 621 to acquire low-frequency, long-offset survey data.

In some embodiments, the long-offset streamers 621 may each be towed individually by a separate streamer vessel (similar to long-offset streamer vessel 210). In some embodiments, the long-offset streamers 621 may be towed collectively by a single survey vessel (not shown). In some embodiments, the long-offset streamers 621 may be towed by source vessel 610 and/or survey vessel 650 (e.g., with the use of long-offset lead-in lines). In some embodiments, long-offset streamers 621 may be about 8 km to about 50 km long, or in some embodiments about 8 km to about 12 km long. In some embodiments, acquisition, data recording, and/or data processing techniques may be utilized to acquire low frequency data (e.g., less than 10 Hz) with the receivers on long-offset streamer 621. As illustrated, system 600 may be configured and/or operated so that the long-offset streamers 621 are towed at the same or similar forward offset as the standard-offset survey spread 623. For example, the nominal inline distance between forward-most receiver 122-F of the standard-offset survey spread 623 and the forward-most receiver 622-F of the long-offset streamer 621 may be less than about 10 m.

It should be appreciated that system 600 may include more than two long-offset streamers 621. For example, in some embodiments, system 600 may include 3, 4, 5, or even up to 10 long-offset streamers 621. The long-offset streamers 621 may be symmetrically or asymmetrically distributed about the midline of the path of the survey vessel 650. A geophysical survey system with an increased number and/or a wider distribution of long-offset streamers 621 may allow for more survey data to be collected with little increase in time or surveying costs.

It should be appreciated that modified SLO acquisition may include a variety of the survey paths for the components of system 600. For example, FIG. 5 illustrates survey vessel 650 traversing a nominal survey path that follows (inline) source vessel 610 by at least 5 km. In other embodiments, source vessel 610 may traverse a nominal survey path that follows (inline) survey vessel 650 by at least 5 km. In other embodiments, survey vessel 650 may traverse a nominal survey path that is not inline with the nominal survey path of source vessel 610. For example, the nominal survey path of survey vessel 650 may be separated in the crossline direction from the nominal survey path of source vessel 610. In some embodiments, the crossline separation between the nominal survey path of survey vessel 650 and the nominal survey path of source vessel 610 may be less than half of the width of standard-offset survey spread 623. In some embodiments, the crossline separation between the nominal survey path of survey vessel 650 and the nominal survey path of source vessel 610 may be greater than half of the width of standard-offset survey spread 623. Regardless of the crossline separation of the nominal survey paths, the inline separation between source vessel 610 and survey vessel 650 may remain at least 5 km.

Figure 6:
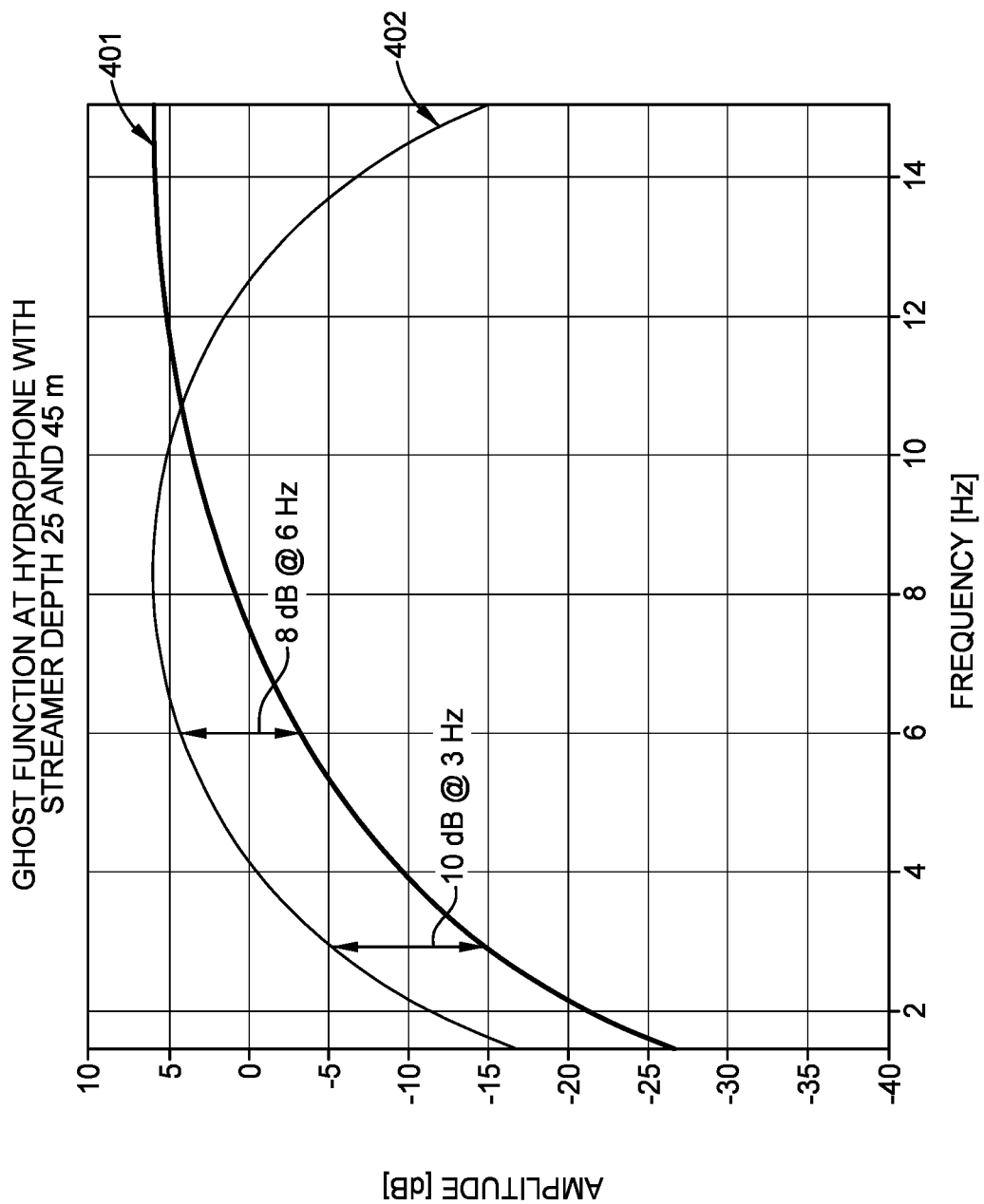
FIG. 6 illustrates a ghost function for seismic receivers towed at two different streamer depths.

FIG. 6 illustrates a ghost function for seismic receivers (e.g., hydrophones) towed at two different streamer depths: 25 m (line 401) and 45 m (line 402). As illustrated, the vertical axis represents amplitude in decibels, and the horizontal axis represents frequency in hertz. It can be seen that the signals differ by about 10 dB at 3 Hz, and by about 8 dB at 6 Hz. In order to manage the ghost function when towing receivers at long-offsets (e.g., with long-offset streamers 621 shown in FIG. 5), some embodiments may process the receiver data by summing together four receiver groupings (e.g., 50 m group lengths). Summing the four receiver groupings may advantageously provide minimal aliasing below 15 Hz. Moreover, the noise may be estimated as the square root of four (the number of groups summed). Therefore, in this instance, the noise floor may be lowered by about 6 dB. Likewise, in order to manage the ghost function when towing receivers at long-offsets (e.g., with long-offset streamers 621), some embodiments may tow the long-offset streamers 621 at about 45 m depth, while towing the standard streamers 120 at depth of about 25 m. By towing the receivers at about 45 m depth, the S/N may be advantageously improved by about 5 dB to about 10 dB in frequency ranges from about 3 Hz to about 8 Hz, at least in part due to the ghost function. In some embodiments, the S/N may be improved by about 11 dB to about 16 dB for frequency ranges from about 3 Hz to about 8 Hz, thereby rivaling S/N achievable by ocean bottom nodes.

Figure 7:
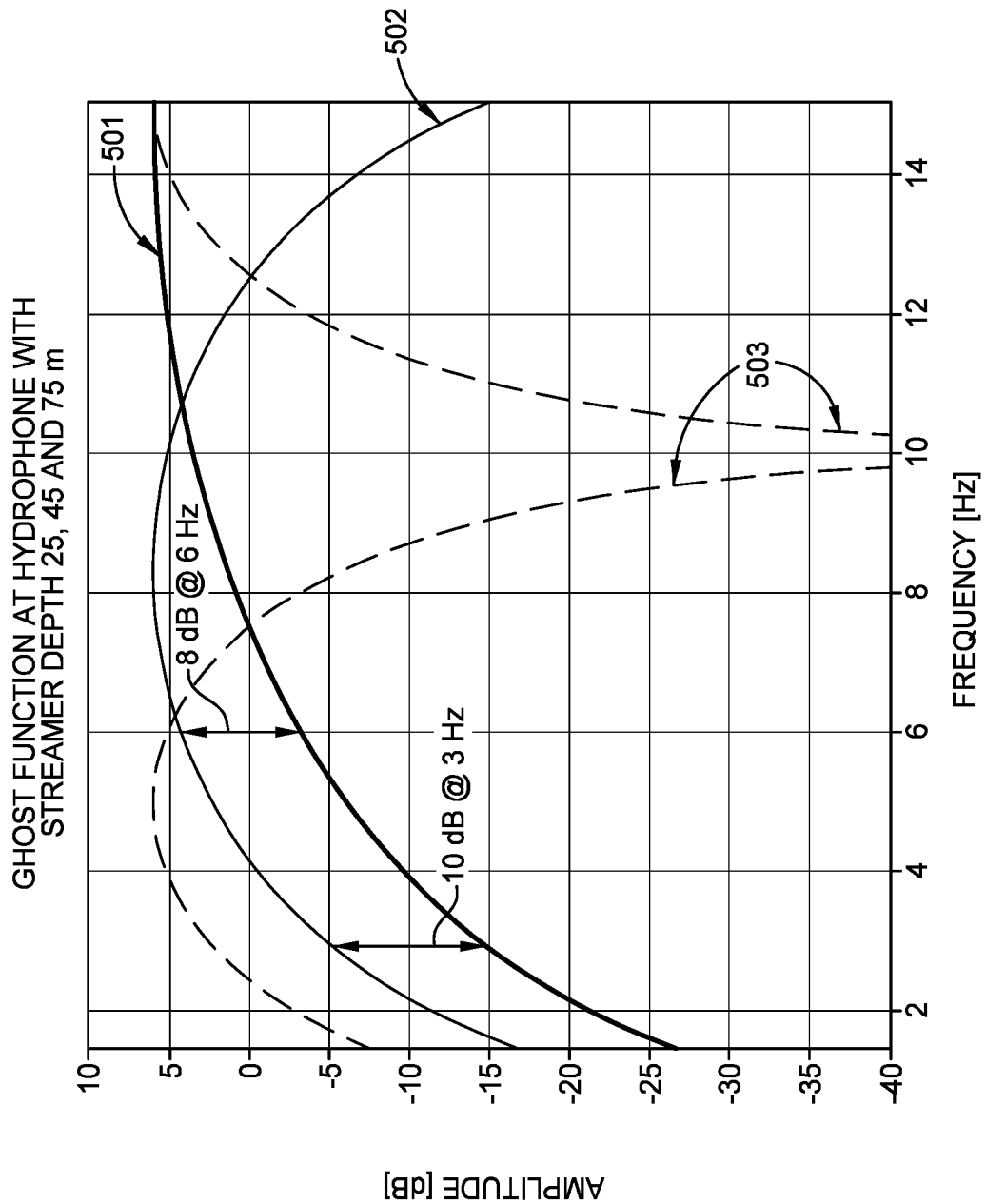
FIG. 7 illustrates a ghost function for seismic receivers towed at three different streamer depths.

FIG. 7 illustrates a ghost function for seismic receivers towed at three different streamer depths: 25 m (line 501), 45 m (line 502), and 75 m (lines 503). As illustrated, the vertical axis represents amplitude in decibels, and the horizontal axis represents frequency in hertz. It can be seen that the signals differ by about 10 dB at 3 Hz, and by about 8 dB at 6 Hz. In order to manage the ghost function when towing receivers at long-offsets, some embodiments may process the receiver data by summing together eight receiver groupings (e.g., 100 m group lengths). Summing the eight receiver groupings may advantageously provide minimal aliasing below 7.5 Hz. Moreover, the noise may be estimated as the square root of eight (the number of groups summed). Therefore, in this instance, the noise floor may be lowered by about 9 dB. Likewise, in order to manage the ghost function when towing receivers at long-offsets, some embodiments may tow long-offset streamers 621 at 75 m depth, while towing the standard streamers 120 at 25 m depth. By towing the receivers at 75 m depth, the S/N may be advantageously improved by about 8 dB to about 17 dB in frequency ranges from about 2 Hz to about 6 Hz, at least in part due to the ghost function. In some embodiments, the S/N may be improved by about 17 dB to about 26 dB for frequency ranges from about 2 Hz to about 6 Hz, thereby rivaling S/N achievable by ocean bottom nodes.

Figure 8:
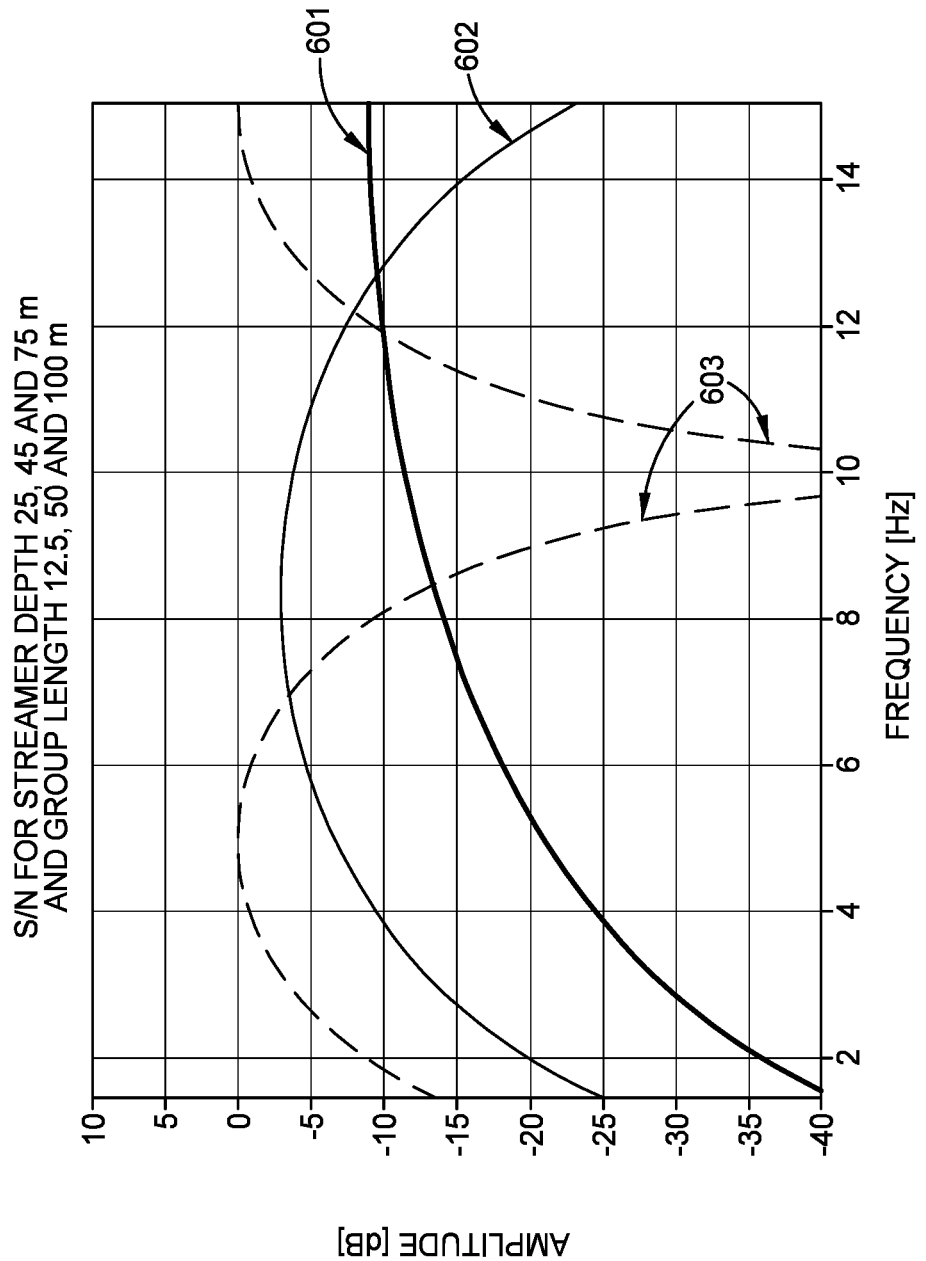
FIG. 8 illustrates relative differences in signal-to-noise ratio for three different scenarios for towing seismic receivers at long-offsets.

FIG. 8 illustrates relative differences in S/N for three different scenarios for towing seismic receivers at long-offsets. One scenario shows the S/N for towing a group of receivers having a group length of about 12.5 m at a depth of about 25 m (line 601). Another scenario shows the S/N for towing a group of receivers having a group length of about 50 m at a depth of about 45 m (line 602). Yet another scenario shows the S/N for towing a group of receivers having a group length of about 75 m at a depth of about 100 m (lines 603).

Figure 9B:
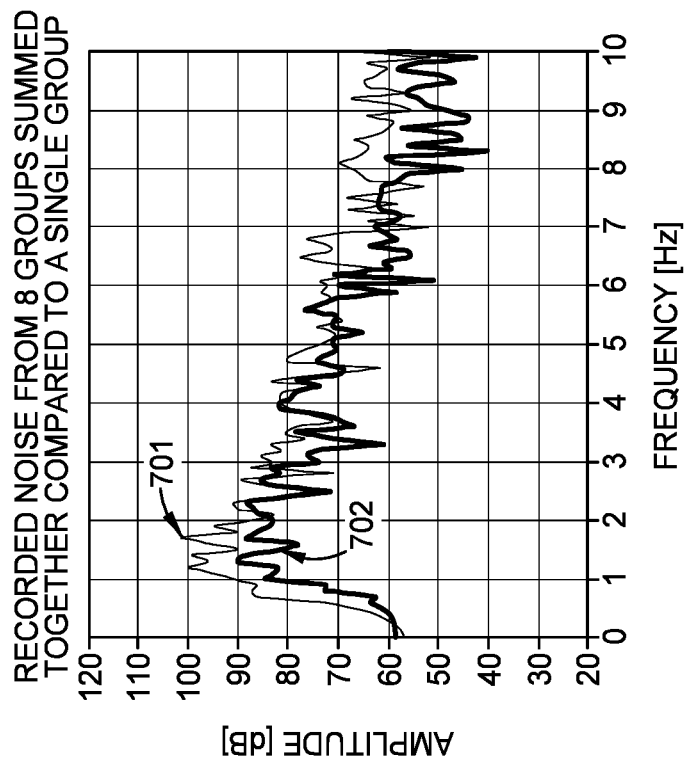
FIGS. 9A and 9B illustrate comparisons of noise for various receiver group lengths.
Figure 9A:
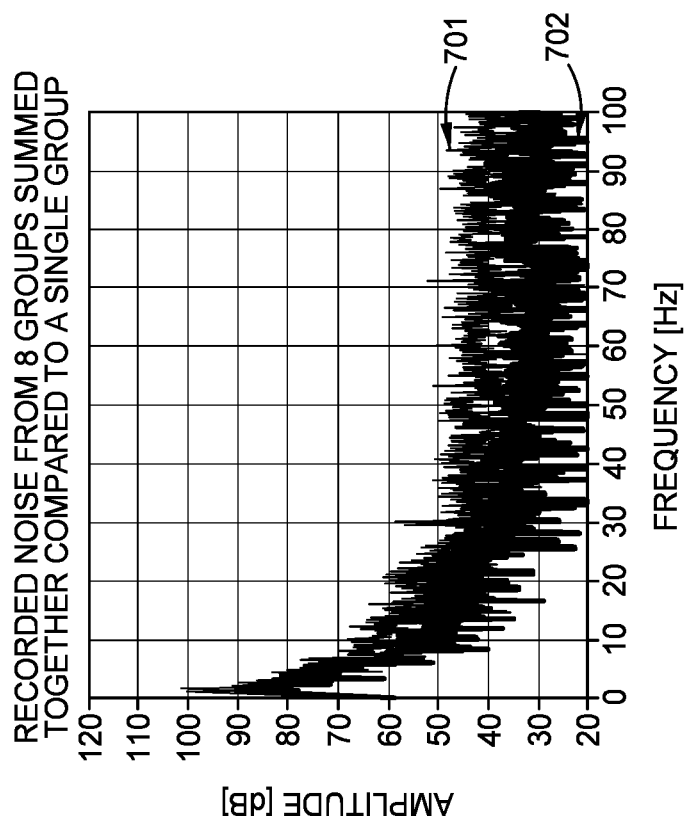

FIGS. 9A and 9B illustrate comparisons of noise (as a function of frequency) for receiver group lengths of about 12.5 m to receiver group lengths of about 100 m. As illustrated, the vertical axis represents amplitude in decibels, and the horizontal axis represents frequency in hertz. Line 701 illustrates the noise present after summing data over receiver group lengths of about 12.5 m. Line 702 illustrates the noise present after summing data over receiver group lengths of about 100 m (e.g., by summing data from eight receiver groupings, each having a receiver group length of about 12.5 m). FIG. 9B is a close-up of FIG. 9A in the range of 0-10 Hz. Note that the noise amplitude is significantly higher for the 12.5 m receiver group length, and the difference is on the order of 10 dB in much of the spectrum below 10 Hz.

Figure 10:
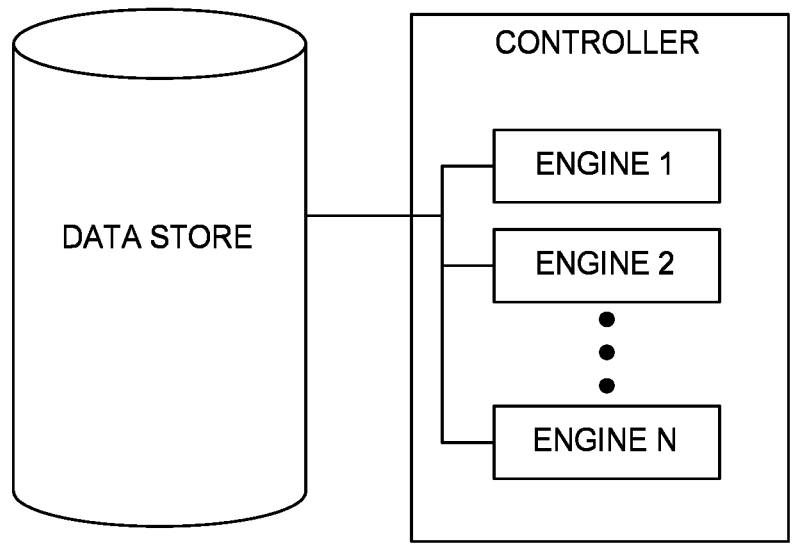
FIG. 10 illustrates a system for a long-offset surveying method.

FIG. 10 illustrates a system for a long-offset surveying method. The system can include a data store and a controller coupled to the data store. The controller can be analogous to the controller described with respect to FIG. 1. The data store can store marine seismic survey data.

The controller can include a number of engines (e.g., engine 1, engine 2, . . . engine N) and can be in communication with the data store via a communication link. The system can include additional or fewer engines than illustrated to perform the various functions described herein. As used herein, an "engine" can include program instructions and/or hardware, but at least includes hardware. Hardware is a physical component of a machine that enables it to perform a function. Examples of hardware can include a processing resource, a memory resource, a logic gate, an application specific integrated circuit, etc.

The number of engines can include a combination of hardware and program instructions that is configured to perform a number of functions described herein. The program instructions, such as software, firmware, etc., can be stored in a memory resource such as a machine-readable medium or as a hard-wired program such as logic. Hard-wired program instructions can be considered as both program instructions and hardware.

The controller can be configured, for example, via a combination of hardware and program instructions in the number of engines for a long-offset acquisition method. For example, a first engine (e.g., engine 1) can be configured to actuate sources, process data, and/or acquire data gathered during acquisition using a long-offset acquisition configuration and method.

Figure 11:
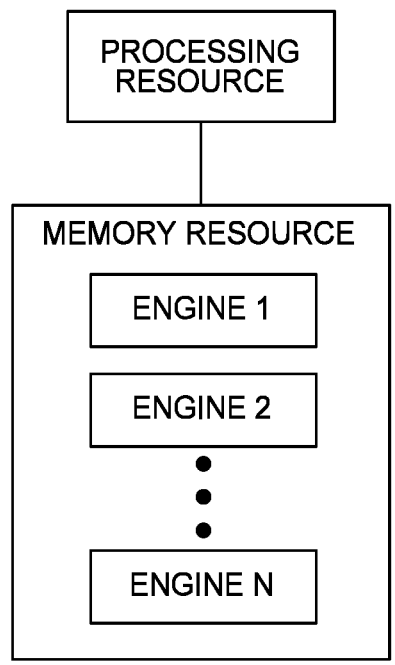
FIG. 11 illustrates a machine for a long-offset acquisition method.

FIG. 11 illustrates a machine for a long-offset acquisition method. In at least one embodiment, the machine can be analogous to the system illustrated in FIG. 10. The machine can utilize software, hardware, firmware, and/or logic to perform a number of functions. The machine can be a combination of hardware and program instructions configured to perform a number of functions (e.g., actions). The hardware, for example, can include a number of processing resources and a number of memory resources, such as a machine-readable medium or other non-transitory memory resources. The memory resources can be internal and/or external to the machine, for example, the machine can include internal memory resources and have access to external memory resources. The program instructions, such as machine-readable instructions, can include instructions stored on the machine-readable medium to implement a particular function. The set of machine-readable instructions can be executable by one or more of the processing resources. The memory resources can be coupled to the machine in a wired and/or wireless manner. For example, the memory resources can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

The memory resources can be tangible and/or non-transitory, and can include volatile and/or non-volatile memory. Volatile memory can include memory that depends upon power to store information, such as various types of dynamic random-access memory among others. Non-volatile memory can include memory that does not depend upon power to store information. Examples of non-volatile memory can include solid state media such as flash memory, electrically erasable programmable read-only memory, phase change random access memory, magnetic memory, optical memory, and/or a solid-state drive, etc., as well as other types of non-transitory machine-readable media.

The processing resources can be coupled to the memory resources via a communication path. The communication path can be local to or remote from the machine. Examples of a local communication path can include an electronic bus internal to a machine, where the memory resources are in communication with the processing resources via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path can be such that the memory resources are remote from the processing resources, such as in a network connection between the memory resources and the processing resources. That is, the communication path can be a network connection. Examples of such a network connection can include a local area network, wide area network, personal area network, and the Internet, among others.

Although not specifically illustrated in FIG. 11, the memory resources can store marine seismic survey data. As is shown in FIG. 11, the machine-readable instructions stored in the memory resources can be segmented into a number of modules (e.g., module 1, module 2, . . . module N) that when executed by the processing resources can perform a number of functions. As used herein a module includes a set of instructions included to perform a particular task or action. The number of modules can be sub-modules of other modules. For example, module 1 can be a sub-module of module 2. Furthermore, the number of modules can comprise individual modules separate and distinct from one another. Examples are not limited to the specific modules illustrated in FIG. 11.

In at least one embodiment of the present disclosure, a first module (e.g., module 1) can include program instructions and/or a combination of hardware and program instructions that, when executed by a processing resource, can actuate sources, process data, and/or acquire data gathered during acquisition using a long-offset acquisition configuration and method.

The methods and systems described herein may be used to manufacture a geophysical data product indicative of certain properties of a subterranean formation. The geophysical data product may include geophysical data such as survey data, seismic data, electromagnetic data, pressure data, particle motion data, particle velocity data, particle acceleration data, and any seismic image that results from using the methods and systems described above. The geophysical data product may be stored on a tangible and/or non-transitory computer-readable medium as described above. The geophysical data product may be produced offshore (i.e., by equipment on the survey vessel) or onshore (i.e., at a computing facility on land) either within the United States or in another country. When the geophysical data product is produced offshore or in another country, it may be imported onshore to a data-storage facility in the United States. Once onshore in the United States, geophysical analysis may be performed on the geophysical data product.

In accordance with a number of embodiments of the present disclosure, a geophysical data product may be produced. The geophysical data product may include, for example, low-frequency and/or long-offset survey data. Geophysical data, such as data previously collected by seismic sensors, electromagnetic sensors, depth sensors, location sensors, etc., may be obtained (e.g., retrieved from a data library) and may be recorded on a non-transitory, tangible computer-readable medium. The geophysical data product may be produced by processing the geophysical data offshore (i.e. by equipment on a vessel) or onshore (i.e. at a facility on land) either within the United States or in another country. If the geophysical data product is produced offshore or in another country, it may be imported onshore to a facility in the United States. In some instances, once onshore in the United States, geophysical analysis, including further data processing, may be performed on the geophysical data product. In some instances, geophysical analysis may be performed on the geophysical data product offshore, for example, FWI.

In an embodiment, a method of marine surveying includes towing a first source with a source vessel; towing a second source with a survey vessel, the survey vessel following the source vessel by at least 5 km; towing a streamer spread at a first depth with the survey vessel; and towing a pair of long-offset streamers at a second depth and following the source vessel by at least 5 km, wherein: the first depth is 10 m to 30 m, and the second depth is greater than 30 m.

In one or more embodiments disclosed herein, the streamer spread is a narrow-azimuth streamer spread.

In one or more embodiments disclosed herein, at least one of the long-offset streamers is towed by a long-offset survey vessel that is distinct from the survey vessel.

In one or more embodiments disclosed herein, the long-offset survey vessel follows an individual track different than that of the survey vessel.

In one or more embodiments disclosed herein, a forward-most receiver on each of the long-offset streamers has a same inline offset from the second source as a forward-most receiver on the streamer spread, each of the long-offset streamers has a length of 8 km to 12 km, and the streamer spread has a length of 6 km to 8 km.

In one or more embodiments disclosed herein, a method includes acquiring survey data with sensors distributed along the long-offset streamers.

In one or more embodiments disclosed herein, a method includes segmenting the survey data by grouping the sensors into a plurality of groups, each group having a group length along the respective long-offset streamer of 40 m to 110 m.

In one or more embodiments disclosed herein, the survey data comprises low-frequency data.

In one or more embodiments disclosed herein, a method includes storing the survey data on a non-transitory machine-readable medium.

In one or more embodiments disclosed herein, the storing the survey data is done by a recording system on the survey vessel.

In one or more embodiments disclosed herein, a method includes generating a geophysical data product with the survey data; and importing the geophysical data product onshore.

In an embodiment, a geophysical data product is produced by towing a first source with a source vessel; towing a second source with a survey vessel, the survey vessel following the source vessel by at least 5 km; towing a streamer spread at a first depth with the survey vessel; and towing a pair of long-offset streamers at a second depth and following the source vessel by at least 5 km, wherein: the first depth is 10 m to 30 m, and the second depth is greater than 30 m.

In an embodiment, a method includes towing a first source with a source vessel; towing a second source with a survey vessel, the first source and the second source being separated by at least 5 km; towing a streamer spread at a first depth with the survey vessel; towing a pair of long-offset streamers at a second depth and following the source vessel by at least 5 km, wherein: the first depth is between 10 m and 30 m, and the second depth is greater than 30 m; acquiring long-offset data with long-offset sensors distributed along the long-offset streamers; and constructing a velocity model with the long-offset data.

In one or more embodiments disclosed herein, the source vessel nominally traverses a first path, the survey vessel nominally traverses a second path, and the first path nominally follows the second path.

In one or more embodiments disclosed herein, the survey vessel tows the pair of long-offset streamers.

In one or more embodiments disclosed herein, the long-offset data comprises low-frequency data.

In one or more embodiments disclosed herein, a method includes acquiring survey data with survey sensors coupled to the streamer spread; and performing Full Wavefield Inversion with the velocity model and the survey data.

In one or more embodiments disclosed herein, the survey data comprises narrow-azimuth data.

In one or more embodiments disclosed herein, a method includes towing a first plurality of streamers at a first depth of 10 m to 30 m; receiving first signals generated by a first source with the first plurality of streamers; towing a second plurality of streamers at a second depth of greater than 30 m; while receiving the first signals, receiving second signals generated by a second source with the second plurality of streamers; wherein: the first source and the second source are separated by at least 5 km, the second signals represent long-offset data, and a forward-most receiver on each of the second plurality of streamers has a same inline offset from the first source as a forward-most receiver on each of the first plurality of streamers.

In one or more embodiments disclosed herein, the first signals represent narrow-azimuth data.

In one or more embodiments disclosed herein, the second plurality consists of two streamers.

In one or more embodiments disclosed herein, each of the second plurality of streamers has a length of 8 km to 12 km, and each of the first plurality of streamers has a length of 6 km to 8 km.

In one or more embodiments disclosed herein, a method includes towing the first source along a first path; and towing the second source along a second path, wherein the first path nominally follows the second path.

In one or more embodiments disclosed herein, a survey vessel tows the first source and the first plurality of streamers.

In one or more embodiments disclosed herein, the survey vessel tows the second plurality of streamers.

While the foregoing is directed to embodiments of the present disclosure, other and further embodiments of the disclosure may be devised without departing from the basic scope thereof, and the scope thereof is determined by the claims that follow.

The invention claimed is:

1. A method of marine surveying, comprising:
towing a first source with a source vessel;
towing a second source with a survey vessel such that an inline separation of at least 5 km exists between the source vessel and the survey vessel;
towing a streamer spread comprising standard-offset streamers at a first depth with the survey vessel such that a lead end of each of the standard-offset streamers is coupled to a spreader line; and
towing at least two long-offset streamers at a second depth with the survey vessel, wherein:
the first depth is 10 m to 30 m;
the second depth is greater than 30 m;
the second source is disposed proximate to a centerline of the streamer spread such that the streamer spread comprises a port side plurality of standard-offset streamers port of the second source and a starboard side plurality of standard-offset streamers starboard of the second source;
the standard-offset streamers in the port side plurality have a constant standard-offset streamer crossline separation between them at the spreader line;
the standard-offset streamers in the starboard side plurality also have the constant standard-offset streamer crossline separation between them at the spreader line;
a first one of the long-offset streamers is disposed proximal to one of the standard-offset streamers in the port side plurality at a first crossline separation therefrom;
a second one of the long-offset streamers is disposed proximal to one of the standard-offset streamers in the starboard side plurality at a second crossline separation therefrom; and
the first crossline separation and the second crossline separation are both smaller than the standard-offset streamer crossline separation.

2. The method of claim 1, wherein; at
the first long-offset streamer is disposed between a port-most pair of the standard-offset streamers; and
the second long-offset streamer is disposed between a starboard-most pair of the standard-offset streamers.

3. The method of claim 1, wherein the source vessel follows an individual track having a crossline offset from that of the survey vessel.

4. The method of claim 1, wherein:
a forward-most receiver on each of the long-offset streamers has a same inline offset from the second source as a forward-most receiver on the streamer spread.

5. The method of claim 1, further comprising:
acquiring low-frequency data with sensors distributed along the long-offset streamers, wherein the low-frequency data comprises data below 10 Hz.

6. The method of claim 5, further comprising
segmenting the low-frequency data by grouping the sensors into a plurality of groups, each group having a group length along the respective long-offset streamer of 40 m to 110 m.

7. The method of claim 1, further comprising:
acquiring survey data with sensors distributed along the long-offset streamers; and
storing the survey data on a non-transitory machine-readable medium, thereby completing the manufacture of a geophysical data product.

8. The method of claim 1, wherein:
each of the standard-offset streamers has a length between 5 km and 10 km; and
each of the long-offset streamers has a length between 8 km and 50 km.

9. The method of claim 5, further comprising:
constructing a velocity model with the long-offset low-frequency data.

10. The method of claim 1, further comprising;
receiving first signals generated by the first source with the first plurality of long-offset streamers; and
while receiving the first signals, receiving second signals generated by the second source
with the standard-offset streamers.

11. The method of claim 1, wherein:
the source vessel sails ahead of the survey vessel.

12. The method of claim 1, wherein:
a center standard-offset streamer is disposed at the centerline of the streamer spread at the spreader line; and
each of the standard-offset streamers in the streamer spread has the constant standard-offset streamer crossline separation between itself and an adjacent standard-offset streamer.

13. The method of claim 1, wherein:
the long-offset streamers are symmetrically distributed approximately a midline of the path of the survey vessel.

14. The method of claim 1, wherein:
each long-offset streamer is disposed with an equal crossline separation from adjacent standard- offset streamers at the spreader line.
15. The method of claim 1, wherein:
the standard-offset streamer crossline separation is between 25 and 200 m; and
the long-offset streamer crossline separation is between 0 m and 100 m.
16. The method of claim 1, wherein:
the standard-offset streamer crossline separation is approximately 100 m; and
the long-offset streamer crossline separation is approximately 50 m.
17. The method of claim 6, wherein:
the group length is approximately 50 m;
the first depth is approximately 25 m; and
the second depth is approximately 45 m.
18. The method of claim 6, wherein:
the group length is approximately 100 m;
the first depth is approximately 25 m; and
the second depth is approximately 75 m.
19. A non-transitory computer readable medium having instructions stored thereon that, when executed by one or more processors, cause the performance of a marine seismic survey comprising:
towing a first source with a source vessel;
towing a second source with a survey vessel such that an inline separation of at least 5 km exists between the source vessel and the survey vessel;
towing a streamer spread comprising standard-offset streamers at a first depth with the survey vessel such that a lead end of each of the standard-offset streamers is coupled to a spreader line; and
towing at least two long-offset streamers at a second depth with the survey vessel, wherein:
the first depth is 10 m to 30 m;
the second depth is greater than 30 m;
the second source is disposed proximate to a centerline of the streamer spread such that the streamer spread comprises a port side plurality of standard-offset streamers port of the second source and a starboard side plurality of standard-offset streamers starboard of the second source;
the standard-offset streamers in the port side plurality have a constant standard-offset streamer crossline separation between them at the spreader line;
the standard-offset streamers in the starboard side plurality also have the constant standard-offset streamer crossline separation between them at the spreader line;
a first one of the long-offset streamers is disposed proximal to one of the standard-offset streamers in the port side plurality at a first crossline separation therefrom;
a second one of the long-offset streamers is disposed proximal to one of the standard-offset streamers in the starboard side plurality at a second crossline separation therefrom; and
the first crossline separation and the second crossline separation are both smaller than the standard-offset streamer crossline separation.
20. The medium of claim 19, wherein:
outermost ones of the standard-offset streamers define a standard-offset streamer crossline spread width; and
the first long-offset streamer and the second long-offset streamer are disposed at respective crossline positions inside the standard-offset streamer crossline spread width.
21. The medium of claim 19, wherein:
the source vessel follows an individual track having a crossline offset from that of the survey vessel.
22. The medium of claim 19, wherein:
each of the standard-offset streamers has a length between 5 km and 10 km; and
each of the long-offset streamers has a length between 8 km and 50 km.
23. The medium of claim 19, wherein:
the source vessel sails ahead of the survey vessel.
24. The medium of claim 19, wherein:
each long-offset streamer is disposed with an equal crossline separation from adjacent standard- offset streamers at the spreader line.
25. The medium of claim 19, wherein:
the standard-offset streamer crossline separation is between 25 and 200 m; and
the long-offset streamer crossline separation is between 0 m and 100 m.
26. A system for performing a marine seismic survey, comprising:
a source vessel configured to tow a first source;
a survey vessel configured to tow a second source such that an inline separation of at least 5 km exists between the source vessel and the survey vessel;
a streamer spread comprising standard-offset streamers configured to be towed at a first depth by the survey vessel such that a lead end of each of the standard-offset streamers is to be coupled to a spreader line during tow; and
at least two long-offset streamers configured to be towed at a second depth by the survey vessel;
wherein the system is configured such that, when it is deployed:
the first depth will be 10 m to 30 m during tow;
the second depth will be greater than 30 m during tow;
the second source will be disposed proximate to a centerline of the streamer spread during tow such that the streamer spread comprises a port side plurality of standard-offset streamers port of the second source and a starboard side plurality of standard-offset streamers starboard of the second source;
the standard-offset streamers in the port side plurality will have a constant standard-offset streamer crossline separation between them at the spreader line during tow;
the standard-offset streamers in the starboard side plurality also will have the constant standard-offset streamer crossline separation between them at the spreader line during tow;
a first one of the long-offset streamers will be disposed proximal to one of the standard-offset streamers in the port side plurality at a first crossline separation therefrom during tow;
a second one of the long-offset streamers will be disposed proximal to one of the standard-offset streamers in the starboard side plurality at a second crossline separation therefrom during tow; and
the first crossline separation and the second crossline separation will both be smaller than the standard-offset streamer crossline separation during tow.
27. The system of claim 26, wherein:
outermost ones of the standard-offset streamers define a standard-offset streamer crossline spread width during tow; and
the first long-offset streamer and the second long-offset streamer are configured to be disposed during tow at respective crossline positions inside the standard-offset streamer crossline spread width.

28. The system of claim 26, wherein:
the source vessel is configured to follow an individual track having a crossline offset from that of the survey vessel when deployed.

29. The system of claim 26, wherein:
each of the standard-offset streamers has a length between 5 km and 10 km when deployed; and
each of the long-offset streamers has a length between 8 km and 50 km when deployed.

30. The system of claim 26, wherein:
the source vessel is configured to sail ahead of the survey vessel when deployed.

31. The system of claim 26, wherein:
each long-offset streamer is configured to be disposed with an equal crossline separation from adjacent standard-offset streamers at the spreader line during tow.

32. The system of claim 26, wherein:
the standard-offset streamer crossline separation is configured to be between 25 and 200 m during tow; and
the long-offset streamer crossline separation will be between 0 m and 100 m during tow.

\* \* \* \* \*